(12) United States Patent
Nanda

(10) Patent No.: US 7,062,604 B1
(45) Date of Patent: *Jun. 13, 2006

(54) METHOD AND SYSTEM FOR FIVE-DISK FAULT TOLERANCE IN A DISK ARRAY

(75) Inventor: Sanjeeb Nanda, Winter Springs, FL (US)

(73) Assignee: Adaptec, Inc., Milpitas, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 10/365,382

(22) Filed: Feb. 12, 2003

(51) Int. Cl.
*G06F 12/00* (2006.01)
(52) U.S. Cl. .................. 711/114; 711/170; 711/173
(58) Field of Classification Search .............. 711/114, 711/170, 173; 714/6, 7, 1
See application file for complete search history.

(56) References Cited

U.S. PATENT DOCUMENTS

| | | | |
|---|---|---|---|
| 5,499,253 A | 3/1996 | Lary | |
| 6,148,430 A | 11/2000 | Weng | |
| 6,327,672 B1 | 12/2001 | Wilner | |
| 6,353,895 B1 | 3/2002 | Stephenson | |

*Primary Examiner*—Kimberly McLean-Mayo
(74) *Attorney, Agent, or Firm*—James H. Beusse; Beusse Wolter Sanks Mora & Maire, P.A.

(57) ABSTRACT

A two-dimensional parity method and system that provides five-disk fault tolerance in an array of disks, such as a RAID system. In an N×M logical representation of data in an array of disks, the method includes arranging strips containing data into two groups of stepped parity sets, the first group organized in a stepped configuration proceeding in one generally diagonal direction, the second group organized in a stepped configuration proceeding in another generally diagonal direction. Parites for respective parity sets in each group are calculated and stored in respective disks and stripes of the array. The method also includes arranging strips into horizontal and diagonal parity sets. In the event of up to five simultaneous disk failures, lost data can be reconstructed by using the corresponding stored horizontal, diagonal, and stepped parity information and the data stored on the remaining intact disks.

62 Claims, 4 Drawing Sheets

Fig. 3

Disks ($d_i$)

| Stripes | $d_1$ | $d_2$ | $d_3$ | ... | $d_{N-2}$ | $d_{N-1}$ | $d_N$ | $d_{N+1}$ | $d_{N+2}$ | $d_{N+3}$ | $d_{N+4}$ | $d_{N+5}$ | $d_{N+6}$ | $d_{N+7}$ |
|---|---|---|---|---|---|---|---|---|---|---|---|---|---|---|
| 1 | $S_{1,1}$ | $S_{1,2}$ | $S_{1,3}$ | ... | $S_{1,N-2}$ | $S_{1,N-1}$ | $S_{1,N}$ | $hP_1$ | $d1P_1$ | $d2P_1$ | $s1P_1$ | $s1P_2$ | $s2P_1$ | $s2P_2$ |
| 2 | $S_{2,1}$ | $S_{2,2}$ | $S_{2,3}$ | ... | $S_{2,N-2}$ | $S_{2,N-1}$ | $S_{2,N}$ | $hP_2$ | $d1P_2$ | $d2P_2$ | $s1P_3$ | $s1P_4$ | $s2P_3$ | $s2P_4$ |
| 3 | $S_{3,1}$ | $S_{3,2}$ | $S_{3,3}$ | ... | $S_{3,N-2}$ | $S_{3,N-1}$ | $S_{3,N}$ | $hP_3$ | $d1P_3$ | $d2P_3$ | $s1P_5$ | $s1P_6$ | $s2P_5$ | $s2P_6$ |
| 4 | $S_{4,1}$ | $S_{4,2}$ | $S_{4,3}$ | ... | $S_{4,N-2}$ | $S_{4,N-1}$ | $S_{4,N}$ | $hP_4$ | $d1P_4$ | $d2P_4$ | $s1P_7$ | $s1P_8$ | $s2P_7$ | $s2P_8$ |
| ... | ... | ... | ... | ... | ... | ... | ... | ... | ... | ... | ... | ... | ... | ... |
| $M-3$ | $S_{M-3,1}$ | $S_{M-3,2}$ | $S_{M-3,3}$ | ... | $S_{M-3,N-2}$ | $S_{M-3,N-1}$ | $S_{M-3,N}$ | $hP_{M-3}$ | $d1P_{M-3}$ | $d2P_{M-3}$ | $s1P_{2M-7}$ | $s1P_{2M-6}$ | $s2P_{2M-7}$ | $s2P_{2M-6}$ |
| $M-2$ | $S_{M-2,1}$ | $S_{M-2,2}$ | $S_{M-2,3}$ | ... | $S_{M-2,N-2}$ | $S_{M-2,N-1}$ | $S_{M-2,N}$ | $hP_{M-2}$ | $d1P_{M-2}$ | $d2P_{M-2}$ | $s1P_{2M-5}$ | $s1P_{2M-4}$ | $s2P_{2M-5}$ | $s2P_{2M-4}$ |
| $M-1$ | $S_{M-1,1}$ | $S_{M-1,2}$ | $S_{M-1,3}$ | ... | $S_{M-1,N-2}$ | $S_{M-1,N-1}$ | $S_{M-1,N}$ | $hP_{M-1}$ | $d1P_{M-1}$ | $d2P_{M-1}$ | $s1P_{2M-3}$ | $s1P_{2M-2}$ | $s2P_{2M-3}$ | $s2P_{2M-2}$ |
| $M$ | $S_{M,1}$ | $S_{M,2}$ | $S_{M,3}$ | ... | $S_{M,N-2}$ | $S_{M,N-1}$ | $S_{M,N}$ | $hP_M$ | $d1P_M$ | $d2P_M$ | $s1P_{2M-1}$ | $s1P_{2M}$ | $s2P_{2M-1}$ | $s2P_{2M}$ |
| $M+1$ | $d1P_{M+1}$ | $d1P_{M+2}$ | $d1P_{M+3}$ | ... | $d1P_{M+N-2}$ | $d1P_{M+N-1}$ | $d2P_{M+1}$ | | | | | | | |
| $M+2$ | $d2P_{M+N-1}$ | $d2P_{M+N}$ | $d2P_{M+N+2}$ | ... | $d2P_{M+3}$ | $d2P_{M+2}$ | | | | | | | | |
| $M+3$ | $s1P_{2M+1}$ | $s1P_{2M+2}$ | $s1P_{2M+3}$ | ... | $s1P_{2M+N-2}$ | | | | | | | | | |
| $M+4$ | | | $s2P_{2M+N+2}$ | ... | $s2P_{2M+3}$ | $s2P_{2M+2}$ | $s2P_{2M+1}$ | | | | | | | |

METHOD AND SYSTEM FOR FIVE-DISK FAULT TOLERANCE IN A DISK ARRAY

BACKGROUND OF THE INVENTION

1. Field of the Invention

The present invention is generally related to disk array architectures, and, specifically, to disk array architectures that provide five disk fault tolerance.

2. Related Art

It is known to store data in an array of disks managed by an array controller to control the storage and retrieval of data from the array. One example of such a system is a Redundant Array of Independent Disks (RAID) comprising a collection of multiple disks organized into a disk array managed by a common array controller. The array controller presents the array to the user as one or more virtual disks. Disk arrays are the framework to which RAID functionality is added in functional levels to produce cost-effective, high-performance disk systems having varying degrees of reliability based on the type of RAID architecture implemented. RAID architecture can be conceptualized in two dimensions as individual disks arranged in adjacent columns. Typically, each disk is partitioned with several identically sized data partitions known as strips, or minor stripes. Distributed across the array of disks in rows, the identically sized partitioned strips form a data stripe across the entire array of disks. Therefore, the array contains stripes of data distributed as rows in the array, wherein each disk is partitioned into strips of identically partitioned data and only one strip of data is associated with each stripe in the array.

As is known, RAID architectures have been standardized into several categories. RAID level 0 is a performance-oriented striped data mapping technique incorporating uniformly sized blocks of storage assigned in a regular sequence to all of the disks in the array. RAID level 1, also called mirroring, provides simplicity and a high level of data availability, but at a relatively high cost due to the redundancy of the disks. RAID level 3 adds redundant information in the form of parity data to a parallel accessed striped array, permitting regeneration and rebuilding of lost data in the event of a single-disk failure. RAID level 4 uses parity concentrated on a single disk to allow error correction in the event of a single disk failure, but the member disks in a RAID 4 array are independently accessible. In a RAID 5 implementation, parity data is distributed across some or all of the member disks in the array. Thus, the RAID 5 architecture achieves performance by striping data blocks among N disks, and achieves fault-tolerance by using 1/N of its storage for parity blocks, calculated by taking the exclusive-or (XOR) of all data blocks in the parity disks row. A RAID 6 architecture is similar to RAID 5, but RAID 6 can overcome the failure of any two disks by using an additional parity block for each row (for a storage loss of 2/N). The first parity block (P) is calculated with XOR of the data blocks. The second parity block (Q) employs Reed-Solomon codes. One drawback of the known RAID 6 implementation is that it requires a complex and computationally time-consuming array controller to implement the Reed-Solomon codes necessary to recover from a two-disk failure. The complexity of Reed-Solomon codes may preclude the use of such codes in software, and may necessitate the use of expensive special purpose hardware. Thus, implementation of Reed-Solomon codes in a disk array increases the cost, complexity, and processing time of the array.

In addition, other schemes have been proposed to implement two-disk fault protection, such as the scheme described in U.S. Pat. No. 6,351,838. While these schemes provide fault tolerance in the case of two simultaneous disk failures, the techniques are not readily scalable to accommodate more than two simultaneous drive failures. For example, other schemes require a prohibitively large number of parity disks in relation to the number of data disks or a prohibitively computationally complex recovery algorithm. Importantly, as the number of drives in an array becomes increasingly larger, the statistical probability of more than two disks failing simultaneously increases and, consequently, more than two drive fault tolerance is required. However, it is believed that five drive fault recovery techniques have not been used in disk array architectures or RAID systems.

Thus, it would be desirable to provide system and method for implementing a five-disk fault recovery architecture that is not subject to complex and computationally time-consuming array control functions encountered in known disk fault tolerance implementations. In addition, it would also be desirable to provide a method that does not limit the size or configuration of the array. Further, it would be desirable to limit the number of additional disks required to implement five-disk fault tolerance.

BRIEF SUMMARY OF THE INVENTION

Generally, the present invention fulfills the foregoing needs by providing in one aspect thereof, a method for providing up to five disk fault tolerance in an array of disks indexed and organized into a plurality of indexed stripes, each stripe including strips indexed by both disk and stripe, and each of the strips being located on a single disk. The method includes arranging strips containing data into a plurality of first parity sets, in which any one strip is included only once in any one of the parity sets. The method also includes arranging strips containing data into a plurality of second parity sets by organizing strips in a stepped configuration for each second parity set such that any one strip may be included in more than one second parity set. The method further includes grouping the second parity sets into a first group of second parity sets and a second group of second parity sets so that each data strip is a member of the first and second group.

In another aspect thereof, the invention includes a method of providing disk fault tolerance in an array of independent disks, wherein the disks are indexed and organized into a plurality of indexed stripes, each stripe further comprising a plurality of strips having a respective disk index and a respective stripe index, each of the strips being located on only a corresponding single disk. The method also includes arranging strips containing data into horizontal, diagonal, and stepped parity sets, wherein each parity set comprises at least one data strip as a member and no single data strip is repeated in any one parity set. The method further includes grouping the stepped parity sets into a first group of stepped parity sets and a second group of stepped parity sets so that each data strip is a member of the first and second group. The method also includes calculating a horizontal parity for each horizontal parity set, calculating a diagonal parity for each diagonal parity set, and calculating a stepped parity for each stepped parity set. In addition, the method includes storing each respective calculated horizontal parity of each horizontal parity set in a corresponding strip of a horizontal parity disk, storing at least some of the calculated diagonal parities of each diagonal parity set in a respective one of a plurality of strips of a diagonal parity disk and storing a remainder of the calculated diagonal parities in a respective one of a plurality of strips in a diagonal parity stripe so that no members of a contributing diagonal parity set have the same disk index as the disk index of the respective one of a plurality of strips of the diagonal parity stripe, and storing at least some of the calculated stepped parities of each stepped parity set in a respective one of a plurality of strips of a stepped parity disk and storing a remainder of the calculated stepped parities in a respective one of a plurality of strips in a stepped parity stripe so that no members of a contributing stepped parity set have the same disk index as the disk index of the respective one of a plurality of strips of the stepped parity stripe.

The present invention further provides, in another aspect thereof, a system for providing disk fault tolerance in an array of independent disks. The system includes an array of disks consecutively indexed and organized into a plurality of indexed stripes, each stripe further including a plurality of strips having a respective disk index and a respective stripe index. The system also includes an array controller coupled to the disk array and configured to arrange strips containing data into a plurality of first parity sets, in which any one strip is included only once in any one of the parity sets. The array controller is further configured to arrange strips containing data into a plurality of second parity sets by grouping strips in a stepped configuration for each second parity set such that any one strip may be included in more than one second parity set. In addition, the array controller is configured to group the second parity sets into a first group of second parity sets and a second group of second parity sets so that each data strip is a member of the first and second group.

In another aspect thereof, the invention includes a system for providing disk fault tolerance in an array of independent disks, including an array of disks consecutively indexed and organized into a plurality of indexed stripes, where each stripe further includes a plurality of strips having a respective disk index and a respective stripe index. The system also includes an array controller coupled to the disk array and configured to arrange the strips containing data into horizontal, diagonal, and stepped parity sets, each set having at least one data strip as a member and group the stepped parity sets into a first group of stepped parity sets and a second group of stepped parity sets so that each data strip is a member of the first and second group. The array controller is further configured to calculate the corresponding horizontal, diagonal, and stepped parities for each of the parity sets and store each of the calculated parities in a corresponding strip.

BRIEF DESCRIPTION OF THE DRAWINGS

The features and advantages of the present invention will become apparent from the following detailed description of the invention when read with the accompanying drawings in which:

FIG. 3 illustrates an exemplary disk array storage format to implement disk fault tolerance using horizontal, diagonal, and stepped parity sets.

Figure 1:
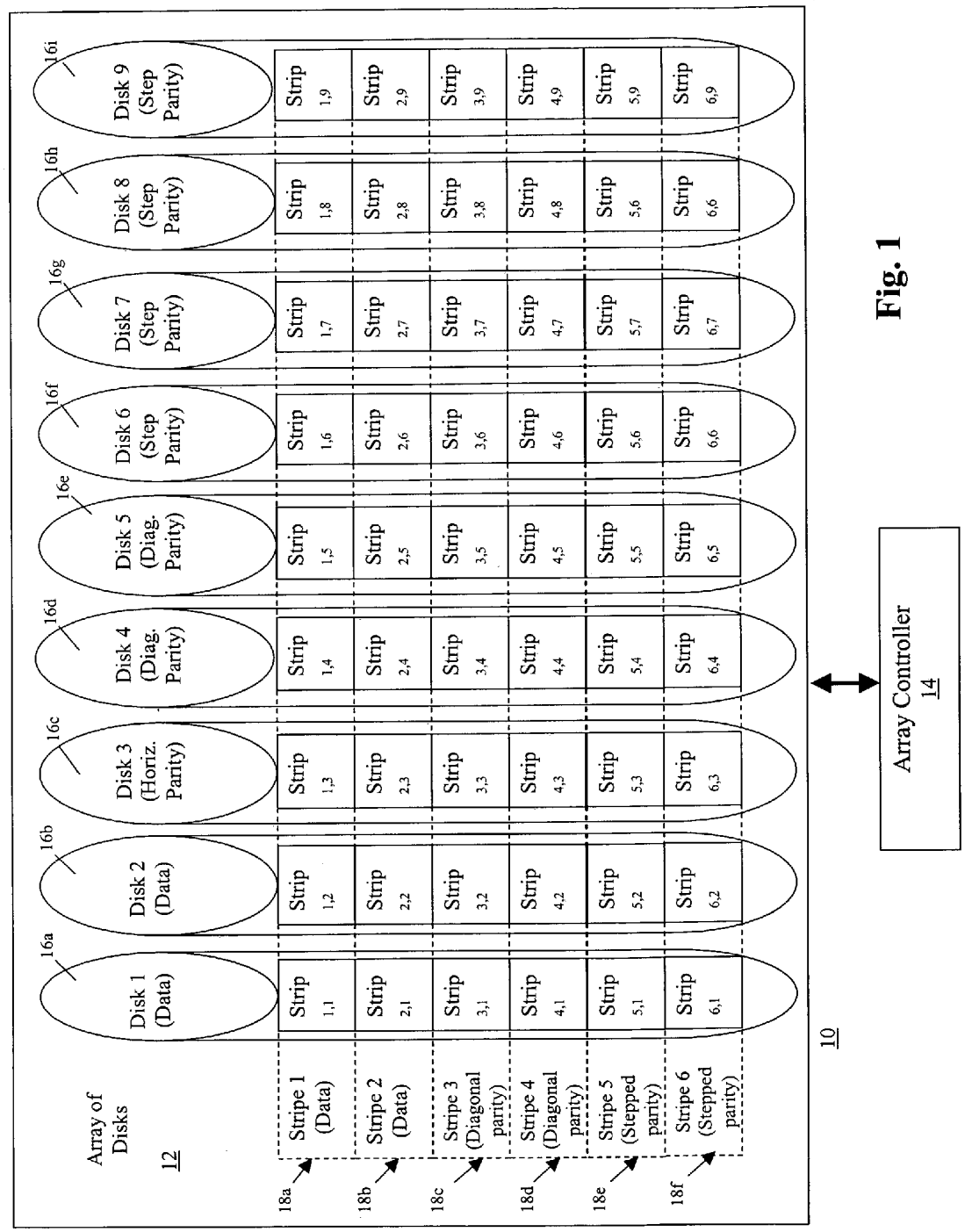
FIG. 1 illustrates a block diagram representation of a data storage system including an array controller and an array of disks.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

FIG. 1 illustrates a data storage system 10 including an array of disks 12 for storing data and an array controller 14 for controlling the storage and retrieval of data in the array 12. In one aspect of the invention, the system 10 may be configured as a RAID 6 type architecture. The array controller 14, coupled to array of disks 12, allocates logical units, or strips, into logical rows, or stripes, extending across the physical disks in the array 12. According to one aspect of the invention, each disk in the array 12 is consecutively indexed, each stripe in the array 12 is consecutively indexed, and each strip is indexed according to the corresponding disk and stripe membership. For example, the array 12 depicted in FIG. 1 includes nine disks, disks 1–9 (16a–16i), allocated with six stripes, stripes 1–6 (18a–18f), so that each disk includes six strips indexed by both disk and stripe membership, and each stripe includes nine strips allocated across the disks. Although FIG. 1, for the sake of simplicity of illustration, illustrates a nine disk array 12 having two data disks (16a, 16b) and configured to include six stripes (18a–18f), it will be understood that the present invention is not limited to a specific number of disks (such as the number of data disks being one less than a prime number) and stripes, nor is it limited to a square data disk configuration ("N×N" data disks).

In one aspect of the invention, the array 12 can be mapped by the array controller 14 to reserve seven disks for storing array reconstruction information. In addition, the mapping includes a reservation of four stripes for storing additional reconstruction information. For example, the highest indexed seven disks, disk 3–9 (16c–16i), can be reserved for storing horizontal parity information, diagonal parity information corresponding to a first group of diagonal parity sets, diagonal parity information corresponding to a second group of diagonal parity sets, and stepped parity information corresponding to a first group of stepped parity sets, and stepped parity information corresponding to a second group of stepped parity sets, respectively. In addition, stripes 3 and 4 (18c and 18d), can be reserved for storing diagonal parity information corresponding to a first group of diagonal parity sets, and diagonal parity information corresponding to a second group of diagonal parity sets, respectively. The highest indexed stripes, stripes 5 and 6, can be reserved for storing stepped parity information corresponding to a first group of stepped parity sets, and stepped parity information corresponding to a second group of stepped parity sets, respectively. The remaining disks in the array, disks 1 and 2 (16a and 16b), can then be used to store data.

Figure 2:
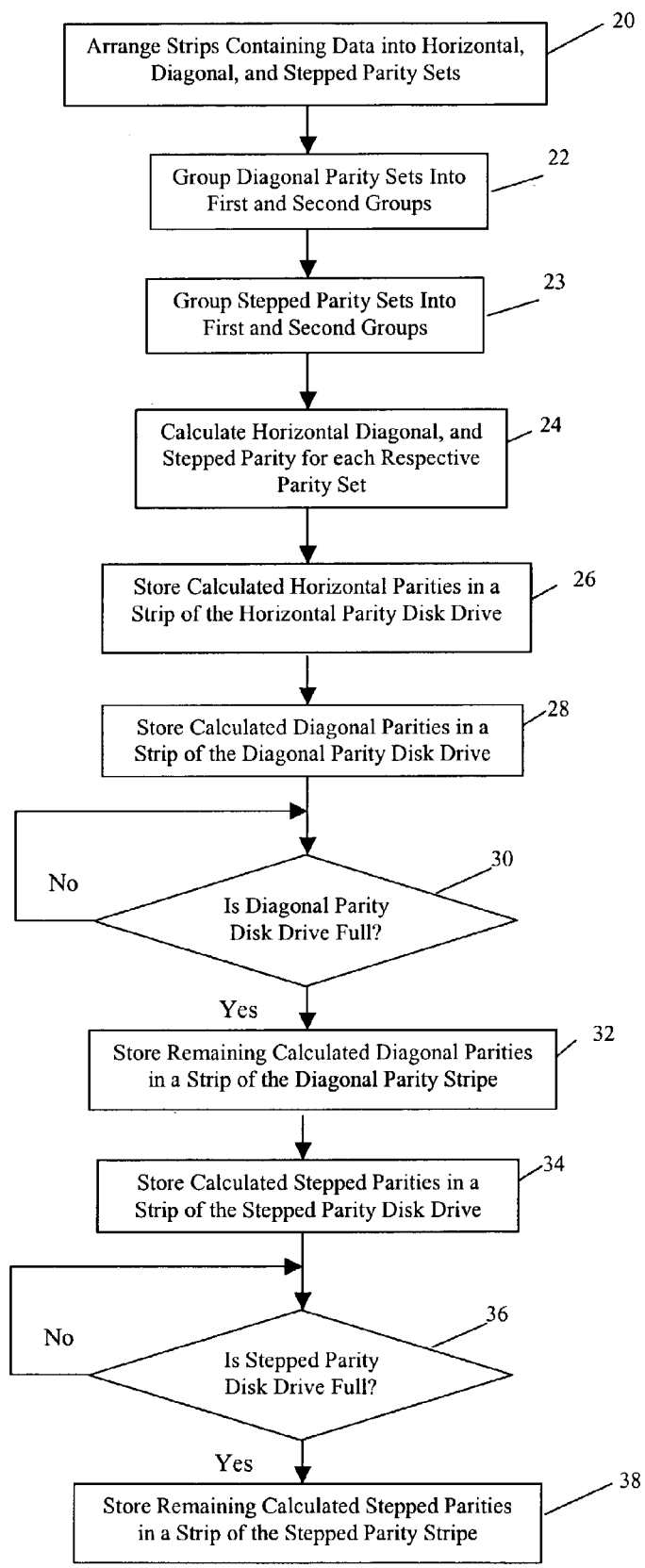
FIG. 2 is a flow chart illustrating a method of providing disk fault tolerance in an array of disks.

FIG. 2 is a flow chart illustrating a method of providing disk fault tolerance in an array of disks allocated as described above. The method can by implemented by the array controller 14, coupled to the array 12, and configured to perform the corresponding method steps. The method includes arranging strips containing data into horizontal, diagonal and stepped parity sets 20. For example, horizontal parity sets can be assembled across each stripe of the array containing data, diagonal parity sets can be assembled across diagonals traversing the stripes in the array that contain data, and stepped parity steps can be assembled in a stair step fashion across the array.

In an aspect of the invention, the diagonal parity sets can be assembled across diagonals traversing the stripes in one direction, and additional diagonal parity sets can be assembled across diagonals traversing the stripes in a different direction. For example, diagonal parity sets can be assembled by establishing a first diagonal parity set as the data strip having the lowest disk and stripe index. Then, consecutive diagonal parity sets can be established by diagonally assembling the data strips adjacent to the previously established diagonal parity set until each data strip has been assembled into a respective diagonal parity set. In another aspect, the diagonal parity sets can be assembled by establishing a first diagonal parity set as the data strip having the highest disk containing data and lowest stripe index. Then, consecutive diagonal parity sets can be established by diagonally assembling the data strips adjacent to the previously established diagonal parity set, proceeding in a lower disk index, higher stripe index direction.

In another embodiment, the stepped parity sets can be assembled in a stair step fashion, such as two strips per tread with a one strip riser, across the stripes in the array that contain data. For example, stepped parity sets can be assembled by establishing a first stepped parity set as the data strip having the lowest disk and stripe index. Then, the next stepped parity set is assembled as the data strip having the lowest disk and lowest stripe index and the data strip having the second lowest disk index and the lowest stripe index to form a two strip "tread." The next stepped parity set includes the data strip having the second lowest disk and lowest stripe index, the data strip having the third lowest disk index and the lowest stripe index (forming another two strip tread), and the data strip having the lowest disk index and the second lowest stripe index, representing an one strip "riser." Stepped parity sets are assembled in this manner until reaching the highest stripe index, highest disk index strip containing data.

In an aspect of the invention, the stepped parity sets can be assembled in a stair step fashion across the stripes in one direction, and additional stepped parity sets can be assembled in a stair step fashion across the stripes in a different direction. For example, a first group of stepped parity sets can be assembled by establishing a first stepped parity set as the data strip having the lowest disk and stripe index. Then, the next stepped parity set is assembled as described in the previous paragraph until reaching the highest stripe index, highest disk index strip containing data. A second group of step parity sets can be assembled by establishing a first stepped parity set as the data strip having the highest disk containing data and lowest stripe index. Then, the next stepped parity set is assembled as the data strip having the highest disk and lowest stripe index and the data strip having the second highest disk index and the lowest stripe index to form a two strip "tread." The next stepped parity set includes the data strip having the second highest disk and lowest stripe index, the data strip having the third highest disk index and the lowest stripe index (forming another two strip tread), and the data strip having the highest disk index and the second lowest stripe index, representing an one strip "riser." Stepped parity sets are assembled in this manner until reaching the highest stripe index, lowest disk index strip containing data.

In one aspect of the invention, each parity set comprises at least one data strip as a member, and no single data strip is repeated in any one parity set. After the parity sets have been assembled, the diagonal parity sets can be further grouped into a first group of diagonal parity sets corresponding to the diagonal parity sets assembled across diagonals traversing the stripes in one direction, and a second group of diagonal parity sets 22 corresponding to the diagonal parity sets assembled across diagonals traversing the stripes in a different direction. In an aspect of the invention, the parity sets are grouped so that each data strip is a member of both the first and second group.

In another aspect of the invention, the stepped parity sets can be further grouped into a first group of stepped parity sets corresponding to the stepped parity sets assembled across the stripes in one direction as described above, and a second group of stepped parity sets 23 corresponding to stepped parity sets assembled across the stripes in a different direction, as described previously. In an aspect of the invention, the parity sets are grouped so that each data strip is a member of both the first and second stepped parity groups.

After the parity sets have been assembled, the parities for each respective parity set are calculated 24 using known parity algorithms. Accordingly, the horizontal parity for each horizontal parity set is calculated using, for example, a simple exclusive (XOR) of the information stored in each member of the horizontal parity set. Similarly, once the diagonal parity sets have been assembled and grouped, the diagonal parities for the first group of diagonal parity sets and the second group of diagonal parity sets can be calculated using known parity algorithms, such as an XOR technique. In addition, once the stepped parities have been assembled, the stepped parities for the stepped parity sets can be calculated using an XOR technique.

After the parities for the horizontal, diagonal, and stepped parity sets are calculated in step 24, the parities are stored in the array so that data and parity information can be reconstructed in the event of a disk failure, such as the loss of five disks simultaneously. In an aspect of the invention, the parities are stored in reserved strips of the array, while the remaining unreserved strips are used for storing data. For example, a disk is reserved to store horizontal parity information, two disks are reserved to store diagonal parity information corresponding to the first and second group of stepped parity sets, respectively, and four disks are reserved to store stepped parity information. Two of the four disks reserved for storing stepped parity (the first and second stepped parity disks) can be used to store stepped parities corresponding the first group, and two of the four disks reserved for storing stepped parity (the third and fourth stepped parity disks) can be used to store stepped parities corresponding the second group. In a further embodiment, two stripes of the array are reserved to store additional diagonal parity information corresponding to the first and second group of diagonal parity sets, respectively. In another aspect, a third and fourth stripe of the array are reserved to store additional stepped parity information corresponding to the first and second group of diagonal parity sets, respectively.

Accordingly, the calculated horizontal parity of each horizontal parity set can be stored in a reserved strip of the horizontal parity disk 26. For example, the horizontal parity for each parity set grouped in a stripe containing data can be stored in a strip of the corresponding stripe of the horizontal parity disk. Next, the calculated diagonal parity of each diagonal parity set is stored in a reserved strip of a diagonal parity disk 28. For example, the diagonal parity for each parity set in the array can be stored in strips of the diagonal parity disks. If the diagonal parity disk is filled 30 before all of the parities of the respective diagonal parity sets have been stored, then the remaining diagonal parities are stored 32 in a strip of a diagonal parity stripe having a disk index that is different from all contributing disk indexes of each data strip of the corresponding diagonal parity set.

In one aspect of the invention, the calculated diagonal parities, beginning with the parity for the first diagonal parity set of the first group, are sequentially stored in respective strips of the diagonal parity disk reserved for the first group. When the diagonal parity strip on the highest indexed stripe containing data is filled, the sequentially calculated diagonal parities are further stored, beginning with the strip on the lowest indexed disk, in the diagonal parity stripe reserved for the first group. This process is continued until the remaining calculated diagonal parities for each of the diagonal parity sets of the first group have been stored.

Similarly, the calculated diagonal parities for the second group, beginning with the strip on the highest indexed disk, are sequentially stored in respective strips of the diagonal parity disk reserved for the second group. When the diagonal parity strip on the highest indexed stripe containing data is filled, the sequentially calculated diagonal parities are further stored (beginning with the strip on the highest indexed disk containing data) in the diagonal parity stripe reserved for the first group. This process is continued until the remaining calculated diagonal parities for each of the diagonal parity sets of the first group have been stored.

Once the calculated diagonal parities have been stored, the calculated stepped parity of each stepped parity set is stored in a reserved strip of a stepped parity disk 34. For example, the stepped parity for each parity set in the array can be stored in alternate strips of first and second stepped parity disks. If the stepped parity disk is filled 36 before all of the parities of the respective stepped parity sets have been stored, then the remaining stepped parities are stored 38 in a strip of a stepped parity stripe having a disk index that is different from all contributing disk indexes of each data strip of the corresponding stepped parity set.

In one aspect of the invention, the calculated stepped parities, beginning with the parity for the first stepped parity set of the first group, are sequentially stored in respective strips of the first and second stepped parity disks reserved for the first group of stepped parity sets. When the stepped parity strip on the second stepped parity disk on the highest indexed stripe containing data is filled, the sequentially calculated stepped parities are further stored, beginning with the strip on the next to lowest indexed disk, in the stepped parity stripe reserved for the first group. This process is continued until the remaining calculated stepped parities for each of the stepped parity sets of the first group have been stored.

Similarly, the calculated stepped parities for the second group, beginning with the parity for the first stepped parity set of the second group, are sequentially stored in respective strips of third and fourth stepped parity disks reserved for the second group of stepped parity sets. When the stepped parity strip on the fourth stepped parity disk on the highest indexed stripe containing data is filled, the sequentially calculated diagonal parities are further stored (beginning with the strip on the third lowest indexed disk containing data) in the parity stripe reserved for the second group of stepped parity sets. This process is continued until the remaining calculated stepped parities for each of the stepped parity sets of the second group have been stored.

In a further aspect of the invention, the method of assembling, grouping, calculating, and storing of parity sets and the corresponding parities in the array are governed by the following properties:

Property 1—A disk contributes at most one strip to the calculation of a given horizontal, first diagonal, second diagonal, or stepped diagonal parity value Property 2—A first diagonal parity strip appears either on a first diagonal parity disk or on a disk having a smaller disk index than all contributing disk indexes of each data strip of the corresponding diagonal parity set.

Property 3—A second diagonal parity strip appears either on a second diagonal parity disk or on a disk having a larger disk index than all contributing disk indexes of each data strip of the corresponding diagonal parity set.

Property 4—A first stepped parity strip appears either on a first or second stepped parity disk or on a disk having a smaller disk index than all contributing disk indexes of each data strip of the corresponding stepped parity set.

Property 5—A second stepped parity strip appears either on a third or fourth stepped parity disk or on a disk having a larger disk index than all contributing disk indexes of each data strip of the corresponding stepped parity set.

I. Creating the Logical Data and Parity Array

FIG. 3 illustrates an exemplary disk array storage format to implement disk fault tolerance using horizontal, diagonal, and stepped parity. In the two dimensional arrangement of FIG. 3, a column represents a disk, $d_i$, having index i, with each cell in a column representing a strip in the disk. In addition, $S_{m,n}$ represents a data strip having a data stripe index of m and a data disk index of n, $hP_i$ represents a horizontal parity strips having index i, $d1P_i$ represents a diagonal parity strip corresponding to a first group of diagonal parity sets having index i, and $d2P_i$ represents a diagonal parity strip corresponding to a second group of diagonal parity sets having index i. Strips labeled in the form $sP_i$ represent stepped parity strips having index i, where $s1P_i$ represents a stepped parity strip corresponding to a first group of stepped parity sets having index i, and $s2P_i$ represents a stepped parity strip corresponding to a second group of stepped parity sets having index i.

The rows in FIG. 3 represent the stripes in the array. In an aspect of the invention, the first N disks are data disks, and the last seven disks (N+1, N+2, N+3, N+4, N+5, N+6, N+7) are parity disks. For example, disk N+1 is used to store horizontal parity, hP, disks N+2 and N+3 are used to store diagonal parities, d1P, d2P, respectively, disks N+4, N+5 are used to alternately store the stepped parities s1P and disks N+6, N+7 are similarly used to alternately store the stepped parities s2P. In another aspect of the invention, the first M stripes in the array are used to store data, and stripes M+1 and M+2, which include the next to last two strips on each of the first N data disks, are used to store additional diagonal parity information. In particular, stripe M+1 is used to store parity for the first group and stripe M+2 is used to store parity for the second group. In a further aspect, the last two strips on each of the first N−1 data disks (located in stripes M+3 and M+4), are used to store additional stepped parity information. Accordingly, disks 1 to N are used for storing data in stripes 1 to M.

In one aspect of the invention, each horizontal parity set is arranged from the data stored in each stripe. The parity for each of the horizontal sets is stored in the corresponding strip of the respective stripe in the horizontal parity disk. For example, the first horizontal parity set is assembled as $S_{1,1}$ to $S_{1,N}$, and the parity for the set is stored in strip $hP_1$. In another aspect of the invention, diagonal parity sets are arranged across diagonals traversing stripes containing data, and the parity for each of the diagonal groups is stored in a strip in a diagonal parity disk and, when the diagonal parity disk is full, the remaining parities are stored in a diagonal parity stripe. For example, the first diagonal parity set of the first diagonal parity group is assembled as $S_{1,1}$ and the parity for the set is stored in strip $d1P_1$. The second diagonal parity set is assembled as $S_{2,1}$ and $S_{1,2}$ and the parity for the set is stored in strip $d1P_2$. The next adjacent data strips are assembled diagonally, and the process continues until the diagonal parity disk for group is filled (i.e., diagonal parities for diagonal parity sets up to index M.) For the next diagonal parity set, (i.e., diagonal parity group having index M+1) the diagonal parity is stored in a strip of the first diagonal parity stripe so that all the contributing data strips of the diagonal parity set are at least one strip to the right of the strip used to store the diagonal parity for that set. The process of filling the diagonal parity stripe continues in this manner until the parities for the remaining diagonal parity sets for the first group are stored. (i.e., the diagonal parity set ending with set $S_{M,N}$.).

Similarly, the first diagonal parity set of the second diagonal parity group is assembled as $S_{1,N}$ and the parity for the set is stored in strip $d2P_1$. The second diagonal parity set is assembled as $S_{1,N-1}$ and $S_{2,N}$ and the parity for the set is stored in strip $d2P_2$. The next adjacent data strips are assembled diagonally, and the process continues until the diagonal parity disk for group is filled (i.e., diagonal parities for diagonal parity sets up to index M.) For the next diagonal parity set, (i.e., diagonal parity group having index M+1) the diagonal parity is stored in a strip of the second diagonal parity stripe so that all the contributing data strips of the diagonal parity set are at least one strip to the left of the strip used to store the diagonal parity for that set. The process of filling the diagonal parity stripe continues in this manner until the parities for the remaining diagonal parity sets for the second group are stored. (i.e., the diagonal parity set ending with set $S_{M,1}$).

In a further aspect of the invention, the parities for each parity set are calculated using the XOR of the information in each data strip of the parity set according to the following formulas. For each horizontal parity set, the horizontal parity, $hP_i$, is calculated according to the equation:

$$hP_i = S_{i,1} \oplus S_{i,2} \oplus S_{i,3} \oplus \ldots S_{i,N}$$

where i is an index counter for the number of stripes in the array containing data, $S_{i,j}$ is the information stored in strip i of disk j, and N is the number of disks containing data.

For each diagonal parity set of the first group, the diagonal parity, $d1P_i$, is calculated according to the equations:

$$d1P_i = S_{1,i} \oplus S_{2,i-1} \oplus S_{3,i-2} \oplus \ldots S_{i,1}, \text{ for } i \leq N;$$

$$d1P_i = S_{i-N+1,N} \oplus S_{i-M+2,N-1} \oplus S_{i-N+3,N-2} \oplus \ldots S_{i,1}, \text{ for } N < i \leq M; \text{ and}$$

$$d1P_i = S_{i-N+1,N} \oplus S_{i-N+2,N-1} \oplus S_{i-N+3,N-2} \oplus \ldots S_{M,i-M+1}, \text{ for } M < i < M+N;$$

where i is an index counter for the number of stripes containing data, $S_{i,j}$ is the information stored in strip i of disk j, N is the number of disks containing data in the array, and M is the number of stripes containing data in the array.

For each diagonal parity set of the second group, the diagonal parity, $d2P_i$, is calculated according to the equations:

$$d2P_i = S_{1,N-i+1} \oplus S_{2,N-i+2} \oplus S_{3,N-i+3} \oplus \ldots S_{i,N}, \text{ for } i \leq N;$$

$$d2P_i = S_{i-N+1,1} \oplus S_{i-N+2,2} \oplus S_{i-N+3,3} \oplus \ldots S_{i,N}, \text{ for } N < i \leq M; \text{ and}$$

$$d2P_i = S_{i-N+1,1} \oplus S_{i-N+2,2} \oplus S_{i-N+3,3} \oplus \ldots S_{M, M+N-i}, \text{ for } M < i < M+N;$$

where i is an index counter for the number of stripes containing data, $S_{i,j}$ is the information stored in strip i of disk j, N is the number of disks containing data in the array, and M is the number of stripes containing data in the array.

Figure 4:
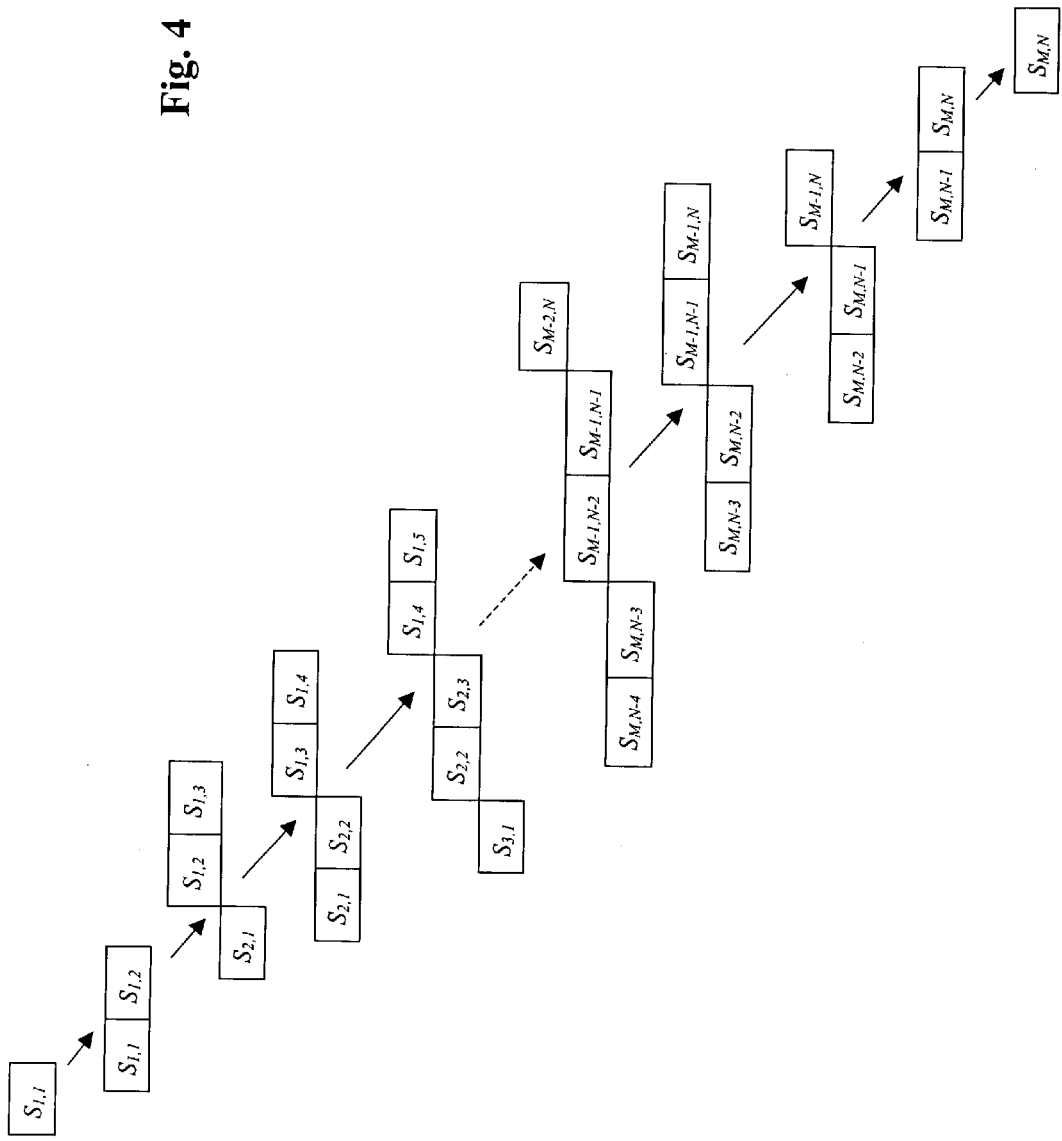
FIG. 4 illustrates an exemplary method of grouping data in the array format of FIG. 3 into stepped parity sets.

In another aspect of the invention, stepped parity sets are arranged in a stair step pattern traversing stripes containing data. FIG. 4 illustrates an exemplary method of grouping data in the array format of FIG. 3 into stepped parity sets. For example, the stepped parity sets can be arranged to form stepped parity sets having a two strip "tread" and a one strip "riser." The parity for each of the stepped parity sets is stored in a strip in a stepped parity disk and, when the stepped parity disk is full, the remaining parities are stored in a stepped parity stripe. In an aspect of the invention, the stepped parities corresponding to the first group of stepped parities are alternately stored in a first stepped parity disk and second stepped parity disk, and the remaining stepped parities are stored in the stepped parity stripe.

As shown in FIG. 4, the first stepped parity set is assembled as $S_{1,1}$, and the parity for the set is stored in strip $s1P_1$ of the first stepped parity disk. The second stepped parity set is assembled as $S_{1,1}$ and $S_{1,2}$ and the parity for the set is stored in strip $s1P_2$ of the second stepped parity disk. The third stepped parity set is assembled as $S_{1,2}$ and $S_{1,3}$ and includes a second tread in the form of $S_{2,1}$. The parity for the third stepped parity set is stored in strip $s1P_3$ of the first stepped parity disk. The data strips are progressively assembled into stepped parity sets in a higher disk, higher stripe indexed direction as shown in FIG. 4. The parities for each of the stepped parity sets are calculated and alternately stored in the first and second stepped parity disks until the stepped parity disks are filled to stripe M (i.e., stepped parities for stepped parity sets up to index 2M.)

For the next stepped parity set, (i.e., stepped parity set having index 2M+1) the stepped parity is stored in a strip of the first stepped parity stripe so that all the contributing data strips of the stepped parity set are at least one strip to the right of the strip used to store the stepped parity for that set. The process of filling the stepped parity stripe continues in this manner until the parities for the remaining stepped parity sets for the first group are stored. (i.e., the stepped parity set having index 2M+N−3, ending with strip $S_{M,N}$.).

Similarly, the stepped parities of the second group can be assembled, starting at $S_{1,N}$ and the parity for the set is stored in strip $s2P_1$ of the third stepped parity disk. The second stepped parity set is assembled as $S_{1,N}$ and $S_{1,N-1}$ and the parity for the set is stored in strip $s2P_2$ of the fourth stepped parity disk. The third stepped parity set is assembled as $S_{1,N-1}$ and $S_{1,N-2}$ and includes a second tread in the form of $S_{2,N}$. The parity for the third stepped parity set is stored in strip $s2P_3$ of the third stepped parity disk. The data strips are progressively assembled into stepped parity sets in a lower disk, higher stripe indexed direction. The parities for each of the stepped parity sets are calculated and alternately stored in the third and fourth stepped parity disks until the stepped parity disks are filled to stripe M (i.e., stepped parities for stepped parity sets up to index 2M.)

For the next stepped parity set, (i.e., stepped parity set having index 2M+1) the stepped parity is stored in a strip of the second stepped parity stripe so that all the contributing data strips of the stepped parity set are at least one strip to the right of the strip used to store the stepped parity for that set. The process of filling the stepped parity stripe continues in this manner until the parities for the remaining stepped parity sets for the first group are stored. (i.e., the stepped parity set having index 2M+N−3, ending with strip $S_{M,1}$.).

In a further aspect of the invention, the stepped parities for the first group of stepped parities are calculated using the XOR of the information in each data strip of the stepped parity set according to the following formulas. For each stepped parity set of the first group, the stepped parity, $s1P_i$, is calculated according to the equations:

$$s1P_i = B_{1,i} \oplus B_{2,i-2} \oplus B_{3,i-4} \oplus \ldots B_{p,q} \text{ if } 1 \leq i \leq N,$$

$$s1P_i = B_{r,t} \oplus B_{r+1,t-2} \oplus B_{r+2,t-4} \oplus \ldots B_{p,q} \text{ if } N < i \leq 2M,$$

$$s1P_i = B_{r,t} \oplus B_{r+1,t-2} \oplus B_{r+2,t-4} \oplus \ldots B_{M,u} \text{ if } 2M < i < 2M+N-1,$$

where i is an index counter for the number of stepped parity sets arranged in the array, N is the number of disks containing data in the array, M is the number of stripes containing data in the array, $B_{i,k} = S_{i,k}$ if k=1, $B_{i,k} = S_{i,k} \oplus S_{i,k-1}$ if $1 < k \leq N$, $B_{i,k} = S_{i,k-1}$ if k=N+1, $S_{i,k}$ is the data stored in strip i of disk k, p=(i+1)div 2, q=(i−1)mod 2+1, r=(i−N+2)div 2, t=N+(N+i)mod 2, and u=(i−2M)+2.

Similarly, the stepped parities for the second group of stepped parities are calculated using the XOR of the information in each data strip of the stepped parity set according to the following formulas. For each stepped parity set of the second group, the stepped parity, $s2P_i$, is calculated according to the equations:

$$s2P_i = B_{1,N-i+1} \oplus B_{2,N-i+3} \oplus B_{3,N-i+5} \oplus \ldots B_{p,N-q+1} \text{ if } 1 \leq i \leq N,$$

$$s2P_i = B_{r,t} \oplus B_{r+1,t+2} \oplus B_{r+2,t+4} \oplus \ldots B_{p,N-q+1} \text{ if } N < i \leq 2M,$$

$$s2P_i = B_{r,t} \oplus B_{r+1,t+2} \oplus B_{r+2,t+4} \oplus \ldots B_{M,u} \text{ if } 2M < i < 2M+N-1,$$

where i is an index counter for the number of stepped parity sets arranged in the array, N is the number of disks containing data in the array, M is the number of stripes containing data in the array, $B_{i,k} = S_{i,k+1}$ if k=0, $B_{i,k} = S_{i,k} \oplus S_{i,k+1}$ if $1 \leq k \leq N-1$, $B_{i,k} = S_{i,k}$ if k=N, $S_{i,k}$ is the information stored in strip i of disk k, p=(i+1)div 2, q=(i−1)mod 2+1, r=(i−N+2)div 2, t=1−(N+i)mod 2, and u=N+2M−(i+1).

In yet another aspect of the invention, the horizontal, diagonal, and stepped parity columns can be positioned to the left or right of the N data disks. In addition, the stripes containing parity may be positioned above or below the data stripes. Thus, a variety of formatting schemes using horizontal, diagonal, and stepped parities can be used by one skilled in the art to create the fault tolerant disk array using the techniques of the invention and provided the required properties are obeyed.

II. Recovering Data and Parity in the Array

Once the data is stored in the array according to the previous section, data and parity can be efficiently recovered for disk failure events, such as the simultaneous failure of four disks in the array. By using the stored horizontal parity, the stored diagonal parity, the stored step parities and the remaining data on the disks, the information on failed disks can be efficiently and quickly recreated. While the sections below describe techniques for the failure recovery of any five disks simultaneously in the array, one skilled in the art can apply the techniques to the simultaneous failure of four or fewer disks in the array. The following sections describe the possible failure modes of any five of the disks in the array and the procedures to be followed in reconstructing the data and parity stored on the failed disks.

A. Failure of any Five Parity Disks

In the case of the failure of any five of the parity disks (i.e., the horizontal parity disk, the diagonal parity disks, or the stepped parity disks), the reconstruction of the parities for the five disks is straightforward. Because the data disks remain intact, the corresponding parities can be regenerated and stored in the respective parity disk according to a pre-failure configuration. For example, the horizontal parity for each horizontal parity set can be recalculated and restored, the diagonal parity for each diagonal parity set can be recalculated and restored in the respective diagonal parity disk and diagonal parity stripe, and the stepped parity for each stepped parity set can be recalculated and restored in the respective stepped parity disk and stepped parity stripe.

B. Failure of a Data Disk and any Four Parity Disks

In the case of the failure of a data disk and any four parity disks, reconstructing the lost data includes reconstructing each of the data strips of the failed data disk, starting with the strip on the lowest indexed stripe, by using the corresponding parity information from the three intact (non-failed) parity disks, the parity information on the intact parity stripes, and the other data members of the corresponding parity sets. Once the failed disk is restored, the parities on the failed disk can be recalculated from the intact data disks stored in the appropriate parity disk and parity stripe.

Regardless of which four parity disks fail, there are at least three parity disks remaining that, in conjunction with the four stripes of the array of disks, contain at least one complete set of parities—horizontal (hP), diagonal (d1P or d2P) or stepped (s1P or s2P)—required to rebuild disk $d_i$. None of the parities located on the last four strips of disk $d_i$ can be derived from data on $d_i$ itself (according to properties 2, 3, 4 and 5 described previously) because members of the parity sets whose parity is stored on disk $d_i$ are located either to the left or right of $d_i$. Thus, the parity information from which disk $d_i$ can be reconstructed is located entirely on the three remaining parity disks, regardless of which three parity disks remain intact, and the last four stripes of the functioning data disks. Once the failed disk $d_i$ has been reconstructed, the four damaged parity disks can be reconstructed because all the data disks required for recalculating the parities on the failed parity disks are now intact.

C. Failure of Two Data Disks and Any Three Parity Disks

If two data disks and three parity disks fail simultaneously, then there are four parity disks remaining that, in conjunction with the last four stripes of the array of disks, contain at least two complete set of parities—horizontal (hP), diagonal (ldP or rdP) or stepped (s1P or s2P). Reconstruction of the failed data disks is based on the nature of the remaining parity sets. Once the two failed data disks have been recreated, the damaged parity disks can be easily recreated from data on the intact and restored data disks. The following cases indicate the various combinations of surviving parity disks and the manner in which reconstruction is achieved in each case.

1. One Horizontal and One Diagonal Disk or Stepped Parity Disks Intact a. First Diagonal or First and Second Stepped Parity Disks Intact In the case of two failed data disks (where one disk has a lower index, and the other disk has a higher index) and three failed parity disks, where the first diagonal parity disk or the first and second stepped parity disks (storing parity for the first group of stepped parity sets) remain intact, data is reconstructed by starting at the strip on the lowest indexed stripe of the lower index failed data disk and the strip on the lowest indexed stripe of the higher index failed data disk. Data is then recreated in each of the failed disks by alternately reconstructing the data strip of the lower indexed failed data disk by using the corresponding intact parities from an intact parity disk and the other members of the corresponding parity sets. For example, if the first diagonal parity disk is intact (i.e., one of either the first and second stepped parity disks have failed), then data is recreated in each of the failed disks by alternately reconstructing the data strip of the lower indexed failed data disk by using the corresponding intact diagonal parity and the other members of the corresponding diagonal parity sets of the first group. Alternatively, if the first and second stepped parity disks are intact (i.e., the first diagonal parity disk has failed), then data is recreated in each of the failed disks by alternately reconstructing the data strip of the lower indexed failed data disk by using the corresponding intact stepped parity set of the first group that includes the strip on the lowest indexed stripe of the lower index failed data disk as the highest disk indexed strip and the other members of the corresponding stepped parity set. The data strip of the higher indexed failed data disk is then reconstructed by using the corresponding horizontal parity and the other members of the corresponding horizontal parity set. The process is alternately repeated until each data strip in each of the failed disks is reconstructed. Once the failed data disks have been reconstructed, the failed parity disks and the parity strips of the failed data disks can be recreated using the members of the corresponding parity set that is now intact.

In FIG. 3 for example, the disk having a lower index is designated as $d_i$, and the disk having a higher index is designated $d_k$. Thus i<k. The data in each failed disk is alternately reconstructed starting with strip $S_{1,i}$ using the corresponding diagonal parity information of the first group (if intact) or, alternatively, the stepped parity information of the first group for the stepped parity set that contains $S_{1,i}$ as the rightmost member if the first and second stepped parity disks are intact. This is possible because the strips contributing to the diagonal parity set of the first group or the stepped parity set of the first group containing $S_{1,i}$ all occur to the left of disk $d_i$ or on the corresponding first diagonal parity disk or first and second stepped parity disks. Then, strip $S_{1,k}$ is reconstructed using the corresponding horizontal parity information. Next, strip $S_{2,i}$ is reconstructed using the corresponding diagonal parity information of the first group or the stepped parity information of the first group, followed by strip $S_{2,k}$ using the corresponding horizontal parity information.

For any row index r, the diagonal parity information of the first group or the stepped parity information of the first group required to reconstruct strip $S_{r,i}$ is guaranteed to be available because the strips on data disks needed to reconstruct the parity information are in rows less than r on disks to the right of strip $S_{r,i}$ and on rows greater than r on disks to the left of strip $S_{r,i}$. At this point, the only unavailable data strip required for this purpose is found on disk $d_k$. However, since disk $d_k$ is located to the right of disk $d_i$, the required data strip would have been already reconstructed using the described technique before arriving at strip $S_{r,i}$. Furthermore, the diagonal parity strip or the stepped parity strip required to reconstruct strip $S_{r,i}$ is either located on the diagonal parity disk of the first group (or the stepped parity disks of the first group) or is located on a disk to the left of strip $S_{r,i}$, wherein the required disks are intact. Once all the data strips have been reconstructed, the corresponding parity strips are recreated as needed and the failed parity disks are recreated using the members of the corresponding parity sets.

b. Second Diagonal or Third and Fourth Stepped Parity Disks Intact

In the case of two failed data disks (where one disk has a lower index, and the other disk has a higher index) and three failed parity disks, where the second diagonal parity disk or the third and fourth stepped parity disks (storing parity for the second group of stepped parity sets) remain intact, data is reconstructed by starting at the strip on the lowest indexed stripe of the higher index failed data disk and the strip on the lowest indexed stripe of the lower index failed data disk. Data is then recreated in each of the failed disks by alternately reconstructing the data strip of the higher indexed failed data disk by using the corresponding intact parities from an intact parity disk and the other members of the corresponding parity sets. For example, if the second diagonal parity disk is intact (i.e., one of either the third and fourth stepped parity disks have failed), then data is recreated in each of the failed disks by alternately reconstructing the data strip of the higher indexed failed data disk by using the corresponding intact diagonal parities and the other members of the corresponding diagonal parity sets of the second group. Alternatively, if the third and fourth stepped parity disks are intact (i.e., the first diagonal parity disk has failed), then data is recreated in each of the failed disks by alternately reconstructing the data strip of the higher indexed failed data disk by using the corresponding intact stepped parity set of the second group that includes the strip on the lowest indexed stripe of the higher index failed data disk as the lowest disk indexed strip and the other members of the corresponding stepped parity set. The data strip of the lower indexed failed data disk is then reconstructed by using the corresponding horizontal parity and the other members of the corresponding horizontal parity set. The process is alternately repeated until each data strip in each of the failed disks is reconstructed. Once the failed data disks have been reconstructed, the failed parity disks and the parity strips of the failed data disks can be recreated using the members of the corresponding parity set that is now intact.

In FIG. 3 for example, the disk having a lower index is designated as $d_i$, and the disk having a higher index is designated $d_k$. Thus i<k. The data in each failed disk is alternately reconstructed starting with strip $S_{1,k}$ using the corresponding diagonal parity information of the second group (if intact) or, alternatively, the stepped parity information of the second group for the stepped parity set that contains $S_{1,k}$ as the leftmost member, if the third and fourth stepped parity disks are intact. This is possible because the strips contributing to the diagonal parity set of the second group or the stepped parity set of the second group for $S_{1,k}$ all occur to the right of disk $d_k$ or on the corresponding second diagonal parity disk or third and fourth stepped parity disks. Then, strip $S_{1,i}$ is reconstructed using the corresponding horizontal parity information. Next, strip $S_{2,k}$ is reconstructed using the corresponding diagonal parity information of the second group or the stepped parity of the second group, followed by strip $S_{2,i}$ using the corresponding horizontal parity information.

For any row index r, the diagonal parity information of the second group or the stepped parity information of the second group required to reconstruct strip $S_{r,k}$ is guaranteed to be available because the strips on data disks needed to reconstruct the parity information are in rows less than r on disks to the left of strip $S_{r,k}$ and on rows greater than r on disks to the right of strip $S_{r,k}$. At this point, the only unavailable data strip required for this purpose is found on disk $d_i$. However, since disk $d_i$ is located to the left of disk $d_k$, the required data strip would have been already reconstructed using the described technique before arriving at strip $S_{r,k}$. Furthermore, the diagonal parity strip or the stepped parity strip required to reconstruct strip $S_{r,k}$ is either located on the diagonal parity disk of the second group (or the stepped parity disks of the second group) or is located on a disk to the right of disk $d_k$, wherein the required disks are intact. Once all the data strips have been reconstructed, the corresponding parity strips are recreated as needed and the failed parity disks are recreated using the members of the corresponding parity sets.

2. At Least Two of the Diagonal and Stepped Parity Disk Sets Intact a. Second Diagonal Parity and Third and Forth Stepped Parity Disks Intact In the case of two failed data disks (where one disk has a lower index, and the other disk has a higher index) and three failed parity disks, where the second diagonal parity disk and the third and fourth stepped parity disks (storing parity for the second group of stepped parity sets) remain intact, data is reconstructed by starting at the strip on the lowest indexed stripe of the higher index failed data disk and the strip on the lowest indexed stripe of the lower index failed data disk. Data is then recreated by sequentially reconstructing (incrementing the stripe index of the disk by 1 for each iteration) the data strips of the higher index failed data disk by using the corresponding diagonal and the other members of the corresponding diagonal parity set of the second group. The data strips are sequentially reconstructed, until reaching the data strip of the higher index failed data disk having a stripe index equal to the difference in the indexes of the two failed data disks. Then, the strip on the lowest index stripe of the lower index failed data disk is reconstructed using the corresponding stepped parity of the second group and the other members of the corresponding stepped parity set having the current data strip of the lower index failed data disk as the lowest disk indexed member.

From this point, the stripe indexes of each data strip are incremented and data is then recreated by alternately reconstructing the data strips of the higher index failed data disk by using the corresponding diagonal and the other members of the corresponding diagonal parity set of the second group. Then, the strip on the lowest index stripe of the lower index failed data disk is reconstructed using the corresponding stepped parity of the second group and other members of the corresponding stepped parity set having the current data strip of the lower index failed data disk as the lowest disk indexed member on that stripe. This alternating process is repeated until the data strips of the low index failed disks and the higher index failed disks are reconstructed. Once the failed data disks are reconstructed, the strips on the failed parity disks can be restored using the reconstructed data on the disks. Finally, the parity strips on the failed data disks are reconstructed using the appropriate data strips that are intact.

In FIG. 3 for example, the disk having a lower index is designated as $d_i$, and the disk having a higher index is designated $d_k$. Thus i<k. The data in each failed disk is alternately reconstructed starting with strip $S_{1,k}$ using the corresponding diagonal parity information of the second group. This is possible because all the data disks contributing to the diagonal parity set of the second group required to rebuild strip $S_{1,k}$ are located to the right of disk $d_k$, and are therefore guaranteed to be intact. Then, strips $S_{2,k}$, $S_{3,k}$, ... $S_{k-i,k}$ are reconstructed using the corresponding parity sets of the second group. The last strip that can be reconstructed on disk $d_k$ using the diagonal parity set of the second group is $S_{k-i,k}$ because the diagonal parity set of the second group containing strip $S_{k-i+1,k}$ would intersect with strip $S_{1,i}$ on disk $d_i$ which has not been recreated. Therefore, strip $S_{1,i}$ is reconstructed using the stepped parity set of the second group that contains strip $S_{1,i}$ as its leftmost strip. This is possible because all the data disks contributing to the stepped parity set of the second group required to rebuild strip $S_{1,i}$ are located to the right of disk $d_i$ and, on any given data disk, a strip belonging to that stepped parity set of the second group has a row index equal to or lower than the strip belonging to the diagonal parity set of the second group used to recreate strip $S_{k-i,k}$.

Next, strip $S_{k-i+1,k}$ is reconstructed using the diagonal parity information of the second group. Note that reconstruction of strip $S_{k-i+1,k}$ is now possible since strip $S_{1,i}$ which is a member of the diagonal parity set of the second group containing strip $S_{k-i+1,k}$ has already been recreated in the preceding steps. Then, strip $S_{2,i}$ is reconstructed using the corresponding stepped parity information of the second group. In this manner, reconstruction of strips on disks $d_k$ and $d_i$ is iteratively performed in a round-robin fashion using the corresponding diagonal parites of the second group and the stepped parity sets of the second group, respectively. When the reconstruction of disk $d_k$ is completed the remaining strips of disk $d_i$ are reconstructed using the corresponding the stepped parity sets of the second group.

b. First Diagonal Parity and First and Second Stepped Parity Disks Intact

In the case of two failed data disks (where one disk has a lower index, and the other disk has a higher index) and three failed parity disks, where the first diagonal parity disk and the first and second stepped parity disks (storing parity for the first group of stepped parity sets) remain intact, data is reconstructed by starting at the strip on the lowest indexed stripe of the lower index failed data disk and the strip on the lowest indexed stripe of the higher index failed data disk. Data is then recreated by sequentially reconstructing (incrementing the stripe index of the disk by 1 for each iteration) the data strips of the lower index failed data disk by using the corresponding diagonal and the other members of the corresponding diagonal parity set of the first group. The data strips are sequentially reconstructed, until reaching the data strip of the lower index failed data disk having a stripe index equal to the difference in the indexes of the failed data disks. Then, the strip on the lowest index stripe of the higher index failed data disk is reconstructed using the corresponding stepped parity of the first group and the other members of the corresponding stepped parity set having the current data strip of the higher index failed data disk as the highest disk indexed member.

From this point, the stripe indexes of each data strip are incremented and data is then recreated by alternately reconstructing the data strips of the lower index failed data disk by using the corresponding diagonal and the other members of the corresponding diagonal parity set of the first group. Then, the strip on the lowest index stripe of the higher index failed data disk is reconstructed using the corresponding stepped parity of the first group and the other members of the corresponding stepped parity set having the current data strip of the higher index failed data disk as the highest disk indexed member on that stripe. This alternating process is repeated until the data strips of the lower index failed disks and the higher index failed disks are reconstructed. Once the failed data disks are reconstructed, the strips on the failed parity disks can be restored using the reconstructed data on the disks. Finally, the parity strips on the failed data disks are reconstructed using the appropriate data strips that are intact.

In FIG. 3 for example, the disk having a lower index is designated as $d_i$, and the disk having a higher index is designated $d_k$. Thus i<k. The data in each failed disk is alternately reconstructed starting with strip $S_{1,i}$ using the corresponding diagonal parity information of the first group. This is possible because all the data disks contributing to the diagonal parity set of the first group required to rebuild strip $S_{1,i}$ are located to the left of disk $d_i$, and are therefore guaranteed to be intact. Then, strips $S_{2,i}$, $S_{3,i}$, . . . $S_{k-i,i}$ are reconstructed using the corresponding parity sets of the first group. The last strip that can be reconstructed on disk $d_i$ using the diagonal parity set of the first group is $S_{k-i,i}$ because the diagonal parity set of the first group containing strip $S_{k-i+1,i}$ would intersect with strip $S_{1,k}$ on disk $d_k$ which has not been recreated. Therefore, strip $S_{1,k}$ is reconstructed using the stepped parity set of the first group that contains strip $S_{1,k}$ as its rightmost strip. This is possible because all the data disks contributing to the stepped parity set of the first group required to rebuild strip $S_{1,k}$ are located to the left of disk $d_k$ and, on any given data disk, a strip belonging to that stepped parity set of the first group has a row index equal to or lower than the strip belonging to the diagonal parity set of the first group used to recreate strip $S_{k-i,i}$.

Next, strip $S_{k-i+1,i}$ is reconstructed using the diagonal parity information of the first group. Note that reconstruction of strip $S_{k-i+1,i}$ is now possible since strip $S_{1,k}$ which is a member of the diagonal parity set of the first group containing strip $S_{k-i+1,i}$ has already been recreated in the preceding steps. Then, strip $S_{2,k}$ is reconstructed using the corresponding stepped parity information of the first group. In this manner, reconstruction of strips on disks $d_i$ and $d_k$ is iteratively performed in a round-robin fashion using the corresponding diagonal parites of the first group and the stepped parity sets of the first group, respectively. When the reconstruction of disk $d_i$ is completed the remaining strips of disk $d_k$ are reconstructed using the corresponding the stepped parity sets of the first group.

First or Second Diagonal Parity and First and Second or Third and Fourth Stepped Parity Disks Intact In the case of two failed data disks (where one disk has a lower index, and the other disk has a higher index) and three failed parity disks, where either the first or second diagonal parity and either the first and second or third and fourth stepped parity disks remain intact, data is reconstructed by starting at the strip on the lowest indexed stripe of the lower index failed data disk and the strip on the lowest indexed stripe of the higher index failed data disk. Data is then recreated in each of the failed disks by alternately reconstructing the data strip of the lower indexed failed data disk by using the corresponding intact parities from an intact parity disk and the other members of the corresponding parity sets.

For example, data is recreated in each of the failed disks by alternately reconstructing the data strip of the lower indexed failed data disk by using the corresponding intact diagonal parity sets of the first group or the stepped parity sets of the first group that includes the current data strip on the lowest indexed stripe of the lower index failed data disk as the highest disk indexed strip. The data strip of the higher indexed failed data disk is then reconstructed by using the corresponding intact diagonal parity sets of the second group or the stepped parity sets of the second group that includes the current data strip on the lowest indexed stripe of the higher index failed data disk as the lowest disk indexed strip. The process is alternately repeated until each data strip in each of the failed disks is reconstructed. Once the failed data disks have been reconstructed, the failed parity disks and the parity strips of the failed data disks can be recreated using the members of the corresponding parity set that is now intact.

In FIG. 3 for example, the disk having a lower index is designated as $d_i$, and the disk having a higher index is designated $d_k$. Thus i<k. The data in each failed disk is alternately reconstructed starting with strip $S_{1,i}$ using the corresponding diagonal parity information of the first group (if intact) or, alternatively, the stepped parity information of the first group for the stepped parity set that contains $S_{1,i}$ as the rightmost member if the first and second stepped parity disks are intact. This is possible because the strips contributing to the diagonal parity set of the first group or the stepped parity set of the first group containing $S_{1,i}$ all occur to the left of disk $d_i$ or on the corresponding first diagonal parity disk or first and second stepped parity disks. Then, strip $S_{1,k}$ is reconstructed using the corresponding diagonal parity information of the second group (if intact) or, alternatively, the stepped parity information of the second group for the stepped parity set that contains $S_{1,k}$ as the leftmost member if the third and fourth stepped parity disks are intact. This is possible because the strips contributing to the diagonal parity set of the second group or the stepped parity set of the second group for $S_{1,k}$ all occur to the right of disk $d_k$ or on the corresponding second diagonal parity disk or third and fourth stepped parity disks.

Next, strip $S_{2,i}$ is reconstructed using the corresponding diagonal parity information of the first group or the stepped parity information of the first group, followed by strip $S_{2,k}$ using the corresponding diagonal parity information of the second group or the stepped parity information of the second group.

For any row index of r, the diagonal parity information of the first group or the stepped parity information of the first group required to reconstruct strip $S_{r,i}$ is guaranteed to be available because the strips on data disks needed to reconstruct the parity information are in rows less than r on disks to the right of strip $S_{r,i}$ and on rows greater than r on disks to the left of strip $S_{r,i}$. At this point, the only unavailable data strip required for this purpose is potentially on disk $d_k$. However, since disk $d_k$ is located to the right of disk $d_i$, the required data strips would have been already reconstructed using the described technique before arriving at strip $S_{r,i}$. Furthermore, the diagonal parity strip or the stepped parity strip required to reconstruct strip $S_{r,i}$ is either located on the diagonal parity disk of the first group (or the stepped parity disks of the first group) or is located on a disk to the left of disk $d_i$, wherein the required disks are intact.

Similarly, for any row index of r, the diagonal parity information of the second group or the stepped parity information of the second group required to reconstruct strip $S_{r,k}$ is guaranteed to be available because the strips on data disks needed to reconstruct the parity information are in rows less than r on disks to the left of strip $S_{r,k}$ and on rows greater than r on disks to the right of strip $S_{r,k}$. At this point, the only unavailable data strip required for this purpose is potentially on disk $d_i$. However, since disk $d_i$ is located to the left of disk $d_k$, the required data strips would have been already reconstructed using the described technique before arriving at strip $S_{r,k}$. Furthermore, the diagonal parity strip or the stepped parity strip required to reconstruct strip $S_{r,k}$ is either located on the diagonal parity disk of the second group (or the stepped parity disks of the second group) or is located on a disk to the right of disk $d_k$, wherein the required disks are intact.

Once all the data strips have been reconstructed, the corresponding parity strips are recreated as needed and the failed parity disks are recreated using the members of the corresponding parity sets.

D. Failure of Three Data Disks and Any Two Parity Disks

If three data disks and two parity disks fail simultaneously, then there are five parity disks remaining that, in conjunction with the last four stripes of the array of intact disks, contain at least three complete set of parities—horizontal (hP), diagonal (ldP or rdP) or stepped (s1P or s2P). Reconstruction of the failed data disks is based on the nature of the remaining parity sets. Once the three failed data disks have been recreated, the damaged parity disks can be easily recreated from data on the intact and restored data disks.

1. One Horizontal and at Least Two of Diagonal Disks or Stepped Parity Disks Intact a. First Diagonal and First and Second Stepped Parity Disks Intact In the case of three failed data disks (where one disk has a low index, one disk has an intermediate index and one disk has a high index) and the diagonal parity disk of the first group and the stepped parity disks of the first group are intact, data is reconstructed by starting at the strip on the lowest indexed stripe of the low index failed data disk, the strip on the lowest index stripe of the intermediate index failed data disk, and the strip on the lowest indexed stripe of the high index failed data disk. Data is then recreated by sequentially reconstructing (incrementing the stripe index of the disk by 1 for each iteration) the data strips of the low index failed data disk by using the corresponding diagonal parity and the other members of the corresponding diagonal parity set of the first group. The data strips are sequentially reconstructed until reaching the data strip of the low index failed data disk having a stripe index equal to the difference in the indexes of the intermediate index failed data disk and the low index failed data disk. Then, the strip on the lowest index stripe of the intermediate index failed data disk is reconstructed using the corresponding stepped parity and the other members of the corresponding stepped parity set having the current data strip of the intermediate index failed data disk as the highest disk indexed member on that stripe. Next, the strip on the lowest indexed stripe of the high index failed data disk is recreated using the corresponding horizontal parity and the other members of the corresponding horizontal parity set.

From this point, the stripe indexes of each data strip are incremented and data is then recreated by alternately reconstructing the data strip of the low index failed data disk by using the corresponding diagonal parity and the other members of the corresponding diagonal parity set of the first group. Then, the data strip of the intermediate index failed data disk is reconstructed by using the corresponding stepped parity and the other members of the corresponding stepped parity set having the data strip of the intermediate index failed data disk as the highest disk indexed member on that stripe. Next, the data strip of the high index failed data disk is reconstructed by using the corresponding horizontal parity and the other members of the corresponding horizontal parity set of the second group. This alternating process is repeated until the data strips of the low index failed disk are reconstructed, whereupon the remaining strips of the intermediate indexed failed disk and the high indexed failed disk are iteratively reconstructed as described above. Once the failed data disks are reconstructed, the strips on the failed parity disks can be restored using the reconstructed data on the disks. Finally, the parity strips on the failed disks are reconstructed using the appropriate data strips that are intact.

In FIG. 3 for example, the disk having a low index is designated as $d_i$, the disk having the intermediate index is designated $d_j$, and the disk having the high index is designated $d_k$. Accordingly, i<j<k. The data in each failed disk is alternately reconstructed starting with strip $S_{1,i}$ using the parity information in the corresponding diagonal parity set of the first group. This is possible because all the disks contributing to the diagonal parity set of the first group required to rebuild strip $S_{1,i}$ are located to the left of disk $d_i$, and are therefore intact. Then, strips $S_{2,i}$, $S_{3,i}$, . . . $S_{j-i,i}$ are reconstructed using the corresponding diagonal parity sets of the first group. The last strip that can be reconstructed on disk $d_i$ using the diagonal parity set of the first group is $S_{j-i,i}$ because the diagonal parity set of the first group containing strip $S_{j-i+1,i}$ would intersect with strip $S_{1,j}$ on disk $d_j$ which has not been recreated yet. Therefore, strip $S_{1,j}$ is reconstructed using the stepped parity set of the first group that contains strip $S_{1,j}$ as its rightmost strip. This is possible because all the data disks contributing to the stepped parity set of the first group required to rebuild strip $S_{1,j}$ are located to the left of disk $d_j$ and, on any given data disk, a strip belonging to that stepped parity set has a row index equal to or lower than the strip belonging to the diagonal parity set used to recreate strip $S_{j-i,i}$. Then, strip $S_{1,k}$ is reconstructed using the corresponding horizontal parity set.

Next, strip $S_{j-i+1,i}$ is reconstructed using the diagonal parity information from the first group. At this point, reconstruction of strip $S_{j-i+1,i}$ is possible since strip $S_{1,j}$ (a member of the diagonal parity set of the first group containing strip $S_{j-i+1,i}$) has already been recreated in the preceding steps. Then, strip $S_{2,j}$ is reconstructed using the corresponding stepped parity information of the first group, followed by the strip $S_{2,k}$ using the horizontal parity set.

This technique is iterated for each failed disk $d_i$, $d_j$ and $d_k$ using the diagonal parity set of the first group, the stepped parity set of the first group, and the horizontal parity, respectively. If and when the reconstruction of disk $d_i$ is completed prior to the others, the reconstruction of the remaining failed disk is accomplished using the iterative technique of reconstructing the remaining strips, first the lower indexed strip, then the higher indexed strip, on a row by row basis (i.e., for each remaining row after disk $d_i$ is completely restored, $d_j$ followed by $d_k$). Once the failed data disks are reconstructed, the strips on the failed parity disks can be restored using the reconstructed data on the disks. Finally, the parity strips on the disks $d_i$, $d_j$ and $d_k$ are reconstructed using the appropriate data strips that are intact.

b. Second Diagonal and Third and Fourth Stepped Parity Disks Intact

In the case of three failed data disks (where one disk has a low index, one disk has an intermediate index and one disk has a high index) and the diagonal parity disk of the second group and the stepped parity disks of the second group are intact, data is reconstructed by starting at the strip on the lowest indexed stripe of the high index failed data disk, the strip on the lowest index stripe of the intermediate index failed data disk, and the strip on the lowest indexed stripe of the low index failed data disk. Data is then recreated by sequentially reconstructing (incrementing the stripe index of the disk by 1 for each iteration) the data strips of the high index failed data disk by using the corresponding diagonal parity and the other members of the corresponding diagonal parity set of the second group. The data strips are sequentially reconstructed until reaching the data strip of the high index failed data disk having a stripe index equal to the difference in the indexes of the high index failed data disk and the intermediate index failed data disk.

Then, the strip on the lowest index stripe of the intermediate index failed data disk is reconstructed using the corresponding stepped parity and the other members of the corresponding stepped parity set having the current data strip of the intermediate index failed data disk as the lowest disk indexed member. Next, the strip on the lowest indexed stripe of the low index failed data disk is recreated using the corresponding horizontal parity and the other members of the corresponding horizontal parity set.

From this point, the stripe indexes of each data strip are incremented and data is then recreated by alternately reconstructing the data strip of the high index failed data disk by using the corresponding diagonal parity and the other members of the corresponding diagonal parity set of the second group. Then, the data strip of the intermediate index failed data disk is reconstructed by using the corresponding stepped parity and the other members of the corresponding stepped parity set of the second group having the data strip of the intermediate index failed data disk as the lowest disk indexed member on that stripe. Next, the data strip of the low index failed data disk is reconstructed by using the corresponding horizontal parity and the other members of the corresponding horizontal parity set. This alternating process is repeated until the data strips of the high index failed disk are reconstructed, whereupon the remaining strips of the intermediate indexed failed disk and the low indexed failed disk are iteratively reconstructed as described above. Once the failed data disks are reconstructed, the strips on the failed parity disks can be restored using the reconstructed data on the disks. Finally, the parity strips on the failed disks are reconstructed using the appropriate data strips that are intact.

In FIG. 3 for example, the disk having a low index is designated as $d_i$, the disk having the intermediate index is designated $d_j$, and the disk having the high index is designated $d_k$. Accordingly, i<j<k. The data in each failed disk is alternately reconstructed starting with strip $S_{1,k}$ using the parity information in the corresponding diagonal parity set of the second group. This is possible because all the disks contributing to the diagonal parity set of the second group required to rebuild strip $S_{1,k}$ are located to the right of disk $d_k$, and are therefore intact. Then, strips $S_{2,k}, S_{3,k}, \ldots S_{k-j,k}$ are reconstructed using the corresponding diagonal parity sets of the second group. The last strip that can be reconstructed on disk $d_k$ using the diagonal parity set of the second group is $S_{k-j,k}$ because the diagonal parity set of the second group containing strip $S_{k-j+1,k}$ would intersect with strip $S_{1,j}$ on disk $d_j$ which has not been recreated yet. Therefore, strip $S_{1,j}$ is reconstructed using the stepped parity set of the second group that contains strip $S_{1,j}$ as its leftmost strip. This is possible because all the data disks contributing to the stepped parity set of the second group required to rebuild strip $S_{1,j}$ are located to the right of disk $d_j$ and, on any given data disk, a strip belonging to that stepped parity set has a row index equal to or lower than the strip belonging to the diagonal parity set used to recreate strip $S_{k-j,k}$. Then, strip $S_{1,i}$ is reconstructed using the corresponding horizontal parity set.

Next, strip $S_{k-j+1,k}$ is reconstructed using the diagonal parity information from the second group. At this point, reconstruction of strip $S_{k-j+1,k}$ is possible since strip $S_{1,j}$ (a member of the diagonal parity set of the second group containing strip $S_{k-j+1,k}$) has already been recreated in the preceding steps. Then, strip $S_{2,j}$ is reconstructed using the corresponding stepped parity information of the first group, followed by the strip $S_{2,i}$ using the horizontal parity set.

This technique is iterated for each failed disk $d_i$, $d_j$ and $d_k$ using the diagonal parity set of the second group, the stepped parity set of the second group, and the horizontal parity set, respectively. If and when the reconstruction of a disk $d_k$ is completed prior to the others, the reconstruction of the remaining failed disk is accomplished using the iterative technique of reconstructing the remaining strips, first the high indexed strip, then the intermediate indexed strip, then the low indexed strip on a row by row basis (i.e., for each remaining row after disk $d_i$ is completely restored, $d_j$ followed by $d_k$). Once the failed data disks are reconstructed, the strips on the failed parity disks can be restored using the reconstructed data on the disks. Finally, the parity strips on the disks $d_i$, $d_j$ and $d_k$ are reconstructed using the appropriate data strips that are intact.

c. Second Diagonal or Third and Fourth Stepped Parity Disks, and First Diagonal or First and Second Stepped Parity Disks Intact In the case of three failed data disks (where one disk has a low index, one disk has an intermediate index and one disk has a high index), where the second diagonal or the third and fourth stepped parity disks and the first diagonal or the first and second stepped parity disks are intact, data is reconstructed by starting at the strip on the lowest indexed stripe of the high index failed data disk, the strip on the lowest indexed stripe of the low index failed data disk, and the strip on the lowest index stripe of the intermediate index failed data disk. Data is then recreated by alternately reconstructing the data strip of the high index failed data disk by using the corresponding diagonal parity and the other members of the corresponding diagonal parity set of the second group or the stepped parity of the second group, according to which parity disks are intact.

Then, the data strip of the low index failed data disk is reconstructed by using the corresponding diagonal parity and the other members of the corresponding diagonal parity set of the first group or the stepped parity set of the first group, according to the parity disks that are intact. Next, the data strip of the intermediate index failed data disk is reconstructed by using the corresponding horizontal parity and the other members of the corresponding horizontal parity set. This alternating process is repeated until each data strip each of the failed disks is reconstructed. Once the failed data disks have been reconstructed, the failed parity disks and the parity strips of the failed data disks can be recreated using the members of the corresponding parity set that is now intact.

In FIG. 3 for example, the disk having a low index is designated as $d_i$, the disk having the intermediate index is designated $d_j$, and the disk having the high index is designated $d_k$. Accordingly, i<j<k. The data in each failed disk is alternately reconstructed starting with strip $S_{1,k}$ and reconstruct the strip using the corresponding diagonal parity and the other members of the corresponding diagonal parity set of the second group or the stepped parity of the second group, according to the parity disks that are intact. This is possible because the strips contributing to the diagonal parity set or stepped parity set of the second group containing $S_{1,k}$ all occur to the right of disk $d_k$ or on the second diagonal parity disk or third and fourth stepped parity disks, wherein the necessary disks are intact. Then, strip $S_{1,i}$ is reconstructed by using the corresponding diagonal parity or stepped parity and the other members of the corresponding diagonal parity set or the stepped parity set of the first group, according to the parity disks that are intact. Again, this is possible because the strips contributing to the diagonal parity or stepped parity set containing $S_{1,i}$ all occur to the left of disk $d_i$ or on the first diagonal parity disk or first and second stepped parity disks, wherein the required disks are all intact. At this point, strip $S_{1,j}$ is reconstructed using the horizontal parity information.

This technique is iterated for each failed disk $d_i$, $d_j$ and $d_k$ using the diagonal or stepped parity set of the first group, the horizontal parity, and the diagonal or stepped parity set of the second group, respectively. Once the failed data disks are reconstructed, the strips on the failed parity disks can be restored using the reconstructed data on the disks. Finally, the parity strips on the disks $d_i$, $d_j$ and $d_k$ are reconstructed using the appropriate data strips that are intact.

2. Three of Diagonal and Stepped Parity Disks Sets Intact a. First Diagonal Parity Disk, First and Second Stepped Parity Disks and Second Diagonal Parity Disk or Third and Fourth Stepped Parity Disks Intact In the case of three failed data disks (where one disk has a low index, one disk has an intermediate index and one disk has a high index) and the diagonal parity disk of the first group, the stepped parity disks of the first group, and the diagonal parity disk of the second group or the stepped parity disks of the second group are intact, data is reconstructed by starting at the strip on the lowest indexed stripe of the low index failed data disk, the strip on the lowest index stripe of the intermediate index failed data disk, and the strip on the lowest indexed stripe of the high index failed data disk. Data is then recreated by sequentially reconstructing (incrementing the stripe index of the disk by 1 for each iteration) the data strips of the low index failed data disk by using the corresponding diagonal parity and the other members of the corresponding diagonal parity set of the first group. The data strips are sequentially reconstructed until reaching the data strip of the low index failed data disk having a stripe index equal to the difference in the indexes of the intermediate index failed data disk and the low index failed data disk. Then, the strip on the lowest index stripe of the intermediate index failed data disk is reconstructed using the corresponding stepped parity of the first group and the other members of the corresponding stepped parity set having the current data strip of the intermediate index failed data disk as the highest disk indexed member. Next, the strip on the lowest indexed stripe of the high index failed data disk is recreated using the corresponding diagonal parity set of the second group or the stepped parity set of the second group, according to the parity disks that are intact.

From this point, the stripe indexes of each data strip are incremented and data is then recreated by alternately reconstructing the data strip of the low index failed data disk by using the corresponding diagonal parity and the other members of the corresponding diagonal parity set of the first group. Then, the data strip of the intermediate index failed data disk is reconstructed by using the corresponding stepped parity and the other members of the corresponding stepped parity set having the data strip of the intermediate index failed data disk as the highest disk indexed member on that stripe. Next, the data strip of the high index failed data disk is reconstructed by using the corresponding diagonal parity of the second group or the stepped parity of the second group, according to the parity disks that are intact. This alternating process is repeated until the data strips of the low index failed disk are reconstructed, whereupon the remaining strips of the intermediate indexed failed disk and the high indexed failed disk are iteratively reconstructed as described above. Once the failed data disks are reconstructed, the strips on the failed parity disks can be restored using the reconstructed data on the disks. Finally, the parity strips on the failed disks are reconstructed using the appropriate data strips that are intact.

In FIG. 3 for example, the disk having a low index is designated as $d_i$, the disk having the intermediate index is designated $d_j$, and the disk having the high index is designated $d_k$. Accordingly, $i<j<k$. The data in each failed disk is alternately reconstructed starting with strip $S_{1,i}$ using the parity information in the corresponding diagonal parity set of the first group. This is possible because all the disks contributing to the diagonal parity set of the first group required to rebuild strip $S_{1,i}$ are located to the left of disk $d_i$, and are therefore intact. Then, strips $S_{2,i}$, $S_{3,i}$, . . . $S_{j-i,i}$ are reconstructed using the corresponding diagonal parity sets of the first group. The last strip that can be reconstructed on disk $d_i$ using the diagonal parity set of the first group is $S_{j-i,i}$ because the diagonal parity set of the first group containing strip $S_{j-i+1,i}$ would intersect with strip $S_{1,j}$ on disk $d_j$ which has not been recreated yet. Therefore, strip $S_{1,j}$ is reconstructed using the stepped parity set of the first group that contains strip $S_{1,j}$ as its rightmost strip. This is possible because all the data disks contributing to the stepped parity set of the first group required to rebuild strip $S_{1,j}$ are located to the left of disk $d_j$ and, on any given data disk, a strip belonging to that stepped parity set has a row index equal to or lower than the strip belonging to the diagonal parity set used to recreate strip $S_{j-i,i}$. Then, strip $S_{1,k}$ is reconstructed using the corresponding diagonal parity of the second group or the stepped parity of the second group, according to the parity disks that are intact. This is possible because all the disks contributing to the diagonal parity or stepped parity set of the second group containing strip $S_{1,k}$ are located to the right of disk $d_k$, and are therefore intact.

Next, strip $S_{j-i+1,i}$ is reconstructed using the diagonal parity information from the first group. At this point, reconstruction of strip $S_{j-i+1,i}$ is possible since strip $S_{1,j}$ (a member of the diagonal parity set of the first group containing strip $S_{j-i+1,i}$) has already been recreated in the preceding steps. Then, strip $S_{2,j}$ is reconstructed using the corresponding stepped parity information of the first group, followed by the strip $S_{2,k}$ using the corresponding diagonal parity set of the second group or the stepped parity set of the second group.

This technique is iterated for each failed disk $d_i$, $d_j$ and $d_k$ using the diagonal parity set of the first group, the stepped parity set of the first group, and the corresponding diagonal parity set of the second group or the stepped parity set of the second group, according to the parity disks that are intact, respectively. If and when the reconstruction of disk $d_i$ is completed prior to the others, the reconstruction of the remaining failed disk is accomplished using the iterative technique of reconstructing the remaining strips, first the lower indexed strip, then the higher indexed strip, on a row by row basis (i.e., for each remaining row after disk $d_i$ is completely restored, $d_j$ followed by $d_k$). Once the failed data disks are reconstructed, the strips on the failed parity disks can be restored using the reconstructed data on the disks. Finally, the parity strips on the disks $d_i$, $d_j$ and $d_k$ are reconstructed using the appropriate data strips that are intact.

b. Second Diagonal Parity Disk, Third and Fourth Stepped Parity Disks Intact, and First Diagonal Parity Disk or First and Second Stepped Parity Disks In the case of three failed data disks (where one disk has a low index, one disk has an intermediate index and one disk has a high index) where the diagonal parity disk of the second group, the stepped parity disks of the second group, and the diagonal parity disk of the first group or the stepped parity disks of the first group are intact, data is reconstructed by starting at the strip on the lowest indexed stripe of the high index failed data disk, the strip on the lowest index stripe of the intermediate index failed data disk, and the strip on the lowest indexed stripe of the low index failed data disk. Data is then recreated by sequentially reconstructing (incrementing the stripe index of the disk by 1 for each iteration) the data strips of the high index failed data disk by using the corresponding diagonal parity and the other members of the corresponding diagonal parity of the second group. The data strips are sequentially reconstructed until reaching the data strip of the high index failed data disk having a stripe index equal to the difference in the indexes of the high index failed data disk and the intermediate index failed data disk. Then, the strip on the lowest index stripe of the intermediate index failed data disk is reconstructed using the corresponding stepped parity of the second group and the other members of the corresponding stepped parity set having the current data strip of the intermediate index failed data disk as the lowest disk indexed member. Next, the strip on the lowest indexed stripe of the low index failed data disk is recreated using the corresponding diagonal parity set of the first group or the stepped parity set of the first group, according to the parity disks that are intact.

From this point, the stripe indexes of each data strip are incremented and data is then recreated by alternately reconstructing the data strip of the high index failed data disk by using the corresponding diagonal parity and the other members of the corresponding diagonal parity set of the second group. Then, the data strip of the intermediate index failed data disk is reconstructed by using the corresponding stepped parity and other members of the corresponding stepped parity set having the data strip of the intermediate index failed data disk as the lowest disk indexed member on that stripe. Next, the data strip of the low index failed data disk is reconstructed by using the corresponding diagonal parity set of the first group or the stepped parity set of the first group, according to the parity disks that are intact. This alternating process is repeated until the data strips of the high index failed data disk are reconstructed, whereupon the remaining strips of the intermediate indexed failed disk and the low indexed failed disk are iteratively reconstructed as described above. Once the failed data disks are reconstructed, the strips on the failed parity disks can be restored using the reconstructed data on the disks. Finally, the parity strips on the failed disks are reconstructed using the appropriate data strips that are intact.

In FIG. 3 for example, the disk having a low index is designated as $d_i$, the disk having the intermediate index is designated $d_j$, and the disk having the high index is designated $d_k$. Accordingly, $i<j<k$. The data in each failed disk is alternately reconstructed starting with strip $S_{1,k}$ using the parity information in the corresponding diagonal parity set of the second group. This is possible because all the disks contributing to the diagonal parity set of the second group required to rebuild strip $S_{1,k}$ are located to the right of disk $d_k$, and are therefore intact. Then, strips $S_{2,k}, S_{3,k}, \ldots S_{k-j,k}$ are reconstructed using the corresponding diagonal parity sets of the second group. The last strip that can be reconstructed on disk $d_k$ using the diagonal parity set of the second group is $S_{k-j,k}$ because the diagonal parity set of the second group containing strip $S_{k-j+1,k}$ would intersect with strip $S_{1,j}$ on disk $d_j$ which has not been recreated yet. Therefore, strip $S_{1,j}$ is reconstructed using the stepped parity set of the second group that contains strip $S_{1,j}$ as its leftmost strip. This is possible because all the data disks contributing to the stepped parity set of the second group required to rebuild strip $S_{1,j}$ are located to the right of disk $d_j$ and, on any given data disk, a strip belonging to the stepped parity set of the second group has a row index equal to or lower than the strip belonging to the diagonal parity set used to recreate strip $S_{k-j,k}$. Then, strip $S_{1,i}$ is reconstructed using the corresponding diagonal parity of the first group or the stepped parity of the first group, according to the parity disks that are intact.

Next, strip $S_{k-j+1,k}$ is reconstructed using the diagonal parity information from the second group. At this point, reconstruction of strip $S_{k-j+1,k}$ is possible since strip $S_{1,j}$ (a member of the diagonal parity set of the second group containing strip $S_{k-j+1,k}$) has already been recreated in the preceding steps. Then, strip $S_{2,j}$ is reconstructed using the corresponding stepped parity information of the second group, followed by the strip $S_{2,i}$ using the corresponding diagonal parity of the first group or the stepped parity of the first group, according to the parity disks that are intact This technique is iterated for each failed disk $d_k$, $d_j$ and $d_i$ using the diagonal parity set of the second group, the stepped parity set of the second group, and the corresponding diagonal parity set of the first group or the stepped parity set of the first group, according to the parity disks that are intact, respectively. If and when the reconstruction of a disk $d_k$ is completed prior to the others, the reconstruction of the remaining failed disk is accomplished using the iterative technique of reconstructing the remaining strips, first the intermediate index strip, then the low indexed strip, on a row by row basis (i.e., for each remaining row after disk $d_k$ is completely restored, $d_j$ followed by $d_i$). Once the failed data disks are reconstructed, the strips on the failed parity disks can be restored using the reconstructed data on the disks. Finally, the parity strips on the disks $d_i$, $d_j$ and $d_k$ are reconstructed using the appropriate data strips that are intact.

E. Failure of Four Data disks and One Parity Disk

If four data disks and one parity disk fail simultaneously, then there are six parity disks remaining that, in conjunction with the last four stripes of the array of intact disks, contain at least four complete set of parities—horizontal (hP), diagonal (ldP or rdP) or stepped (s1P or s2P). Reconstruction of the failed data disks is based on the nature of the remaining parity sets. Once the four failed data disks have been recreated, the damaged parity disks can be easily recreated from data on the intact and restored data disks.

1. Diagonal and Stepped Parity Disks Intact

In the case of four failed data disks, where one disk has a low index, one disk has a low intermediate index, one disk has a high intermediate index and one disk has a high index, data is reconstructed by starting at the strip on the lowest indexed stripe of the low index failed data disk, the strip on the lowest index stripe of the low intermediate index failed data disk, the strip on the lowest index stripe of the high intermediate index failed data disk, and the strip on the lowest indexed stripe of the high index failed data disk. Data is then recreated by sequentially reconstructing (incrementing the stripe index of the disk by 1 for each iteration) the data strips of the low index failed data disk by using the corresponding diagonal parity and the other members of the corresponding diagonal parity of the first group. The data strips are sequentially reconstructed until reaching the data strip of the low index failed data disk having a stripe index equal to the difference in the indexes of the low intermediate index failed data disk and the low index failed data disk.

Then, the strip on the lowest index stripe of the low intermediate index failed data disk is reconstructed using the corresponding stepped parity of the first group and the other members of the corresponding stepped parity set of the first group having the current data strip of the low intermediate index failed data disk as the highest disk indexed member. Next, the strip on the lowest indexed stripe of the high index failed data disk is recreated using the corresponding diagonal parity and the other members of the corresponding diagonal parity set of the second group. Data is then recreated by sequentially reconstructing (incrementing the stripe index of the disk by 1 for each iteration) the data strips of the high index failed data disk by using the corresponding diagonal parity and the other members of the corresponding diagonal parity set of the second group. The data strips are sequentially reconstructed until reaching the data strip of the high index failed data disk having a stripe index equal to the difference in the indexes of the high index failed data disk and the high intermediate failed data disk.

Then, the strip on the lowest index stripe of the high intermediate index failed data disk is reconstructed using the corresponding stepped parity set of the second group and the other members of the corresponding stepped parity set having the current data strip of the high intermediate index failed data disk as the lowest disk indexed member.

From this point, the stripe indexes of each data strip are incremented and data is then recreated by alternately reconstructing the data strip of the low index failed data disk by using the corresponding diagonal parity and the other members of the corresponding diagonal parity set of the first group. Then, the data strip of the low intermediate index failed data disk is reconstructed by using the corresponding stepped parity of the first group and the other members of the corresponding stepped parity set having the data strip of the low intermediate index failed data disk as the highest disk indexed member on that stripe. Next, the data strip of the high index failed data disk is reconstructed by using the corresponding diagonal parity and the other members of the corresponding diagonal parity set of the second group. Then, the data strip of the high intermediate index failed data disk is reconstructed using the corresponding stepped parity and the other members of the corresponding stepped parity set of the second group. This alternating process is repeated until the data strips of the low index failed disk are reconstructed, whereupon the remaining strips of the low intermediate indexed failed disk, the high indexed failed disk, and the high intermediate indexed failed disk are iteratively reconstructed as described above. Finally, the parity strips on the failed disks are reconstructed using the appropriate data strips that are intact.

In FIG. 3 for example, the disk having a low index is designated as $d_i$, the disk having the low intermediate index is designated $d_j$, the disk having the high intermediate index is designated $d_k$, and the disk having the high index is designated $d_l$. Accordingly, $i<j<k<l$. The data in each failed disk is alternately reconstructed starting with strip $S_{1,i}$ using the parity information in the corresponding diagonal parity set of the first group. This is possible because all the disks contributing to the diagonal parity set of the first group required to rebuild strip $S_{1,i}$ are located to the left of disk $d_i$, and are therefore guaranteed to be intact. Then, strips $S_{2,i}$, $S_{3,i}$, . . . $S_{j-i,i}$ are reconstructed using the corresponding diagonal parity sets of the first group. The last strip that can be reconstructed on disk $d_i$ using the diagonal parity set of the first group is $S_{j-i,i}$ because the diagonal parity set of the first group containing strip $S_{j-i+1,i}$ would intersect with strip $S_{1,j}$ on disk $d_j$, which has not been recreated yet. Therefore, strip $S_{1,j}$ is reconstructed using the stepped parity set of the first group that contains strip $S_{1,j}$ as its rightmost strip. This is possible because all the data disks contributing to the stepped parity set of the first group required to rebuild strip $S_{1,j}$ are located to the left of disk $d_j$ and, on any given data disk, a strip belonging to that stepped parity set of the first group has a row index equal to or lower than the strip belonging to the diagonal parity set of the first group used to recreate strip $S_{j-i,i}$. Then, strip $S_{1,l}$ is reconstructed using the corresponding diagonal parity set of the second group. This is because all the disks contributing to the diagonal parity set of the second group required to rebuild strip $S_{1,l}$ are located to the right of disk $d_l$, and are therefore guaranteed to be intact. Then, strips $S_{2,l}$, $S_{3,l}$, . . . $S_{l-k,l}$ are reconstructed using the corresponding diagonal parity sets of the second group.

The last strip that can be reconstructed on disk $d_l$ using the diagonal parity set of the second group is $S_{l-k,l}$ because the diagonal parity set of the second group containing strip $S_{l-k+1,l}$ would intersect with strip $S_{1,k}$ on disk $d_k$, which has not been recreated yet. Therefore, strip $S_{1,k}$ is reconstructed using the stepped parity set of the second group that contains strip $S_{1,k}$ as its leftmost strip. This is possible because all the data disks contributing to the stepped parity set of the first group required to rebuild strip $S_{1,k}$ are located to the right of disk $d_k$ and, on any given data disk, a strip belonging to that stepped parity set of the second group has a row index equal to or lower than the strip belonging to the diagonal parity set of the second group used to recreate strip $S_{k-l,l}$.

Then, strip $S_{2,i}$ is reconstructed using the corresponding diagonal parity set of the first group, followed by reconstruction of strip $S_{2,j}$ using the corresponding stepped parity information of the first group that contains strip $S_{2,j}$. Then, strip $S_{2,l}$ is reconstructed using the corresponding diagonal parity of the of the second group and $S_{2,k}$ is reconstructed using the stepped parity set of the second group having the strip $S_{2,k}$.

This technique is iterated for each failed disk $d_i$, $d_j$, $d_l$, and $d_k$ using the diagonal parity set of the first group, the stepped parity set of the first group, the diagonal parity set of the second group and the stepped parity set of the second group, respectively. If and when the reconstruction of the disk $d_i$, and then $d_l$ is completed prior to the others the reconstruction of the remaining failed disk is accomplished using the iterative technique using the same order (i.e., for each remaining row after disk $d_i$ and $d_l$ is completely restored, $d_j$ followed and $d_k$).

2. Horizontal and Three of the Diagonal and Stepped Parity Disks Intact a. First Diagonal Parity Disk, First and Second Stepped Parity Disk, and Second Diagonal Parity Disk or Third and Fourth Stepped Parity Disk Intact.

In the case of four failed disks, where one disk has a low index, one disk has a low intermediate index, one disk has a high intermediate index and one disk has a high index, data is reconstructed by starting at the strip on the lowest indexed stripe of the low index failed data disk, the strip on the lowest index stripe of the low intermediate index failed data disk, the strip on the lowest index stripe of the high index failed data disk, and the strip on the lowest indexed stripe of the high intermediate index failed data disk. Data is then recreated by sequentially reconstructing (incrementing the stripe index of the disk by 1 for each iteration) the data strips of the low index failed data disk by using the corresponding diagonal parity and the other members of the corresponding diagonal parity of the first group. The data strips are sequentially reconstructed until reaching the data strip of the low index failed data disk having a stripe index equal to the difference in the indexes between the low intermediate index failed disk and the low index failed disk.

Then, the strip on the lowest stripe of the low intermediate index failed data disk is reconstructed using the corresponding stepped parity of the first group and the other members of the corresponding stepped parity set of the first group having the current data strip of the low intermediate index failed data disk as the highest disk indexed member. Next, the strip on the lowest indexed stripe of the high index failed data disk is recreated using the corresponding diagonal parity and the other members of the corresponding diagonal parity set of the second group or the corresponding stepped parity and other members of the corresponding stepped parity set of the second group, according to the parity disks that are intact. Then, the strip on the lowest indexed stripe of the high intermediate index failed data disk is recreated using the corresponding horizontal parity and the other members of the corresponding horizontal parity set.

From this point, the stripe indexes of each data strip are incremented and data is then recreated by alternately reconstructing the data strip of the low index failed data disk by using the corresponding diagonal parity and the other members of the corresponding diagonal parity set of the first group. Then, the data strip of the low intermediate index failed data disk is reconstructed by using the corresponding stepped parity of the first group and the other members of the corresponding stepped parity set of the first group. Next, the data strip of the high index failed data disk is reconstructed by using the corresponding diagonal parity and other members of the corresponding diagonal parity set of the second group or the corresponding stepped parity and the other members of the corresponding stepped parity set of the second group, according to the parity disks that are intact. Then, the data strip of the high intermediate index failed data disk is reconstructed using the corresponding horizontal parity and the other members of the corresponding horizontal parity set. This alternating process is repeated until the data strips of the low index failed disk are reconstructed, whereupon the remaining strips of the low intermediate indexed failed disk, the high indexed failed disk, and the high intermediate indexed failed disk are iteratively reconstructed as described above. Finally, the parity strips on the failed disks are reconstructed using the appropriate data strips that are intact.

In FIG. 3 for example, the disk having a low index is designated as $d_i$, the disk having the low intermediate index is designated $d_j$, the disk having the high intermediate index is designated $d_k$, and the disk having the high index is designated $d_l$. Accordingly, i<j<k<l. The data in each failed disk is alternately reconstructed starting with strip $S_{1,i}$ using the parity information in the corresponding diagonal parity set of the first group. This is possible because all the disks contributing to the diagonal parity set of the first group required to rebuild strip $S_{1,i}$ are located to the left of disk $d_i$, and are therefore guaranteed to be intact. Then, strips $S_{2,i}$, $S_{3,i}$, . . . $S_{j-i,i}$ are reconstructed using the corresponding diagonal parity sets of the first group. The last strip that can be reconstructed on disk $d_i$ using the diagonal parity set of the first group is $S_{j-i,i}$ because the diagonal parity set of the first group containing strip $S_{j-i+1,i}$ would intersect with strip $S_{1,j}$ on disk $d_j$, which has not been recreated yet. Therefore, strip $S_{1,j}$ is reconstructed using the stepped parity set of the first group that contains strip $S_{1,j}$ as its rightmost strip. This is possible because all the data disks contributing to the stepped parity set of the first group required to rebuild strip $S_{1,j}$ are located to the left of disk $d_j$ and, on any given data disk, a strip belonging to that stepped parity set of the first group has a row index equal to or lower than the strip belonging to the diagonal parity set of the first group used to recreate strip $S_{j-i,i}$. Then, strip $S_{1,l}$ is reconstructed using the corresponding diagonal parity information of the second group or stepped parity information of the second group, according to parity disks that are intact. This is because all the disks contributing to the diagonal parity set of the second group required to rebuild strip $S_{1,l}$ are located to the right of disk $d_l$, and are therefore guaranteed to be intact. Then, strip $S_{1,k}$ is reconstructed using the corresponding horizontal parity set.

Next, strip $S_{j-i+1,i}$ is reconstructed using the diagonal parity information from the first group. At this point, reconstruction of strip $S_{j-i+1,i}$ is possible since strip $S_{1,j}$ (a member of the diagonal parity set of the first group containing strip $S_{j-i+1,i}$) has already been recreated in the preceding steps. Then, strip $S_{2,j}$ is reconstructed using the corresponding stepped parity information of the first group, followed by strip $S_{2,l}$ using the corresponding diagonal parity information of the second group or stepped parity information of the second group, according to parity disks that are intact. Then strip $S_{2,k}$ is recreated using the horizontal parity set.

This technique is iterated for each failed disk $d_i$, $d_j$, $d_l$ and $d_k$ using the diagonal parity set of the first group, the stepped parity set of the first group, the corresponding diagonal parity set of the second group or the stepped parity set of the second group, according to the parity disks that are intact, and the horizontal parity set respectively. If and when the reconstruction of disk $d_i$ is completed prior to the others, the reconstruction of the remaining failed disk is accomplished using the iterative technique of reconstructing the remaining strips (i.e., for each remaining row after disk $d_i$ is completely restored, $d_j$ followed by $d_l$ and $d_k$). Once the failed data disks are reconstructed, the strips on the failed parity disks can be restored using the reconstructed data on the disks. Finally, the parity strips on the disks $d_i$, $d_j$ $d_l$ and $d_k$ are reconstructed using the appropriate data strips that are intact.

b. Second Diagonal Parity Disk, Third and Fourth Stepped Parity Disks, and First Diagonal Parity Disk or First and Second Stepped Parity Disks Intact.

In the case of four failed data disks, where one disk has a low index, one disk has a low intermediate index, one disk has a high intermediate index and one disk has a high index, data is reconstructed by starting at the strip on the lowest indexed stripe of the high index failed data disk, the strip on the lowest index stripe of the high intermediate index failed data disk, the strip on the lowest index stripe of the lowest index failed data disk, and the strip on the low intermediate indexed stripe of the high index failed data disk. Data is then recreated by sequentially reconstructing (incrementing the stripe index of the disk by 1 for each iteration) the data strips of the high index failed data disk by using the corresponding diagonal parity and the other members of the corresponding diagonal parity set of the second group. The data strips are sequentially reconstructed until reaching the data strip of the high index failed data disk having a stripe index equal to the difference between the indexes of the high index failed data disk and the high intermediate index failed data disk.

Then, the strip on the lowest index stripe of the high intermediate index failed data disk is reconstructed using the corresponding stepped parity of the second group and the other members of the corresponding stepped parity set of the second group having the current data strip of the high intermediate index failed data disk as the lowest disk indexed member. Next, the strip on the lowest indexed stripe of the low index failed data disk is recreated using the corresponding diagonal parity and the other members of the corresponding diagonal parity set of the first group or the corresponding stepped parity and the other members of the corresponding stepped parity set of the first group, according to the parity disks that are intact. Then, the strip on the lowest indexed stripe of the low intermediate index failed data disk is recreated using the corresponding horizontal parity and the other members of the corresponding horizontal parity set.

From this point, the stripe indexes of each data strip are incremented and data is then recreated by alternately reconstructing the data strip of the high index failed data disk by using the corresponding diagonal parity and the other members of the corresponding diagonal parity of the second group. Then, the data strip of the high intermediate index failed data disk is reconstructed by using the corresponding stepped parity of the second group and the other members of the corresponding stepped parity set of the second group having the current data strip of the high intermediate index failed data disk as the lowest disk indexed member on that stripe. Next, the data strip of the low index failed data disk is reconstructed by using the corresponding diagonal parity and other members of the corresponding diagonal parity set of the first group or the corresponding stepped parity and the other members of the corresponding stepped parity set of the first group, according to the parity disks that are intact. Then, the data strip of the low intermediate index failed data disk is reconstructed using the corresponding horizontal parity and the other members of the corresponding horizontal parity set. This alternating process is repeated until the data strips of the high index failed disk are reconstructed, whereupon the remaining strips of the high intermediate indexed failed disk, the low indexed failed disk, and the low intermediate indexed failed disk are iteratively reconstructed as described above. Finally, the parity strips on the failed disks are reconstructed using the appropriate data strips that are intact.

In FIG. 3 for example, the disk having a low index is designated as $d_i$, the disk having the low intermediate index is designated $d_j$, the disk having the high intermediate index is designated $d_k$, and the disk having the high index is designated $d_l$. Accordingly, $i<j<k<l$. The data in each failed disk is alternately reconstructed starting with strip $S_{1,l}$ using the parity information in the corresponding diagonal parity set of the second group. This is possible because all the disks contributing to the diagonal parity set of the second group required to rebuild strip $S_{1,l}$ are located to the right of disk $d_l$, and are therefore guaranteed to be intact. Then, strips $S_{2,l}$, $S_{3,l}$, ... $S_{l-k,l}$ are reconstructed using the corresponding diagonal parity sets of the second group. The last strip that can be reconstructed on disk $d_l$ using the diagonal parity set of the second group is $S_{l-k,l}$ because the diagonal parity set of the second group containing strip $S_{l-k+1,l}$ would intersect with strip $S_{1,k}$ on disk $d_k$, which has not been recreated yet. Therefore, strip $S_{1,k}$ is reconstructed using the stepped parity set of the second group that contains strip $S_{1,k}$ as its leftmost strip. This is possible because all the data disks contributing to the stepped parity set of the second group required to rebuild strip $S_{1,k}$ are located to the right of disk $d_k$ and, on any given data disk, a strip belonging to that stepped parity set of the second group has a row index equal to or lower than the strip belonging to the diagonal parity set of the second group used to recreate strip $S_{l-k,l}$. Then, strip $S_{1,j}$ is reconstructed using the corresponding diagonal parity information of the first group or stepped parity information of the first group, according to the parity disks that are intact. Then, strip $S_{1,j}$ is reconstructed using the corresponding horizontal parity set.

Next, strip $S_{l-k+1,l}$ is reconstructed using the diagonal parity information from the second group. At this point, reconstruction of strip $S_{l-k+1,l}$ is possible since strip $S_{1,k}$ (a member of the diagonal parity set of the second group containing strip $S_{l-k+1,l}$) has already been recreated in the preceding steps. Then, strip $S_{2,k}$ is reconstructed using the corresponding stepped parity information of the second group, followed by strip $S_{2,i}$ using the corresponding diagonal parity information of the first group or stepped parity information of the first group, according to the parity disks that are intact. Then strip $S_{2,j}$ is recreated using the horizontal parity set.

This technique is iterated for each failed disk $d_i$, $d_k$, $d_i$ and $d_j$ using the diagonal parity set of the second group, the stepped parity set of the second group, the corresponding diagonal parity of the first group or the stepped parity of the first group, according to the parity disks that are intact, and the horizontal parity set respectively. If and when the reconstruction of disk $d_l$ is completed prior to the others, the reconstruction of the remaining failed disks are accomplished using the iterative technique of reconstructing the remaining strips (i.e., for each remaining row after disk $d_l$ is completely restored, $d_k$ followed by $d_i$ and $d_j$). Once the failed data disks are reconstructed, the strips on the failed parity disks can be restored using the reconstructed data on the disks. Finally, the parity strips on the disks $d_i$, $d_j$, $d_k$, and $d_l$ are reconstructed using the appropriate data strips that are intact.

F. Failure of Five Data Disks

In the case of five failed data disks, where one disk has a low index, one disk has a low intermediate index, one disk has an intermediate index, one disk has a high intermediate index and one disk has a high index, data is reconstructed by starting at the strip on the lowest indexed stripe of the low index failed data disk, the strip on the lowest index stripe of the low intermediate index failed data disk, the strip on the lowest indexed stripe of the high index failed data disk, the strip on the lowest index stripe of the high intermediate index failed data disk, and the strip on the lowest index stripe of the intermediate index failed data disk. Data is then recreated by sequentially reconstructing (incrementing the stripe index of the disk by 1 for each iteration) the data strips of the low index failed data disk by using the corresponding diagonal parity and the other members of the corresponding diagonal parity of the first group. The data strips are sequentially reconstructed until reaching the data strip of the low index failed data disk having a stripe index equal to the difference in indexes between the low intermediate index failed data disk and the low index failed data disk.

Then, the strip on the lowest index stripe of the low intermediate index failed data disk is reconstructed using the corresponding stepped parity of the first group and the other members of the corresponding stepped parity set of the first group having the current data strip of the low intermediate index failed data disk as the highest disk indexed member. Next, the strip on the lowest indexed stripe of the high index failed data disk is recreated using the corresponding diagonal parity and the other members of the corresponding diagonal parity set of the second group. Then, data is recreated by sequentially reconstructing (incrementing the stripe index of the disk by 1 for each iteration) the data strips of the high index failed data disk by using the corresponding diagonal parity and the other members of the corresponding diagonal parity set of the second group. The data strips are sequentially reconstructed until reaching the data strip of the high index failed data disk having a stripe index equal to the difference in the indexes of the high index failed data disk and the high intermediate index failed data disk. Then, the strip on the lowest index stripe of the high intermediate index failed data disk is reconstructed using the corresponding stepped parity of the second group and the other members of the corresponding stepped parity set of the second group having the current data strip of the high intermediate index failed data disk as the lowest disk indexed member. Next, the strip on the lowest indexed stripe of the intermediate index failed data disk is recreated using the corresponding horizontal parity and the other members of the corresponding horizontal parity set.

From this point, the stripe indexes of each data strip are incremented and data is then recreated by alternately reconstructing the data strip of the low index failed data disk by using the corresponding diagonal parity and the other members of the corresponding diagonal parity set of the first group. Then, the data strip of the low intermediate index failed data disk is reconstructed by using the corresponding stepped parity of the first group and the other members of the corresponding stepped parity set having the current data strip of the low intermediate index failed data disk as the highest disk indexed member on that stripe. Next, the data strip of the high index failed data disk is reconstructed by using the corresponding diagonal parity and the other members of the corresponding diagonal parity set of the second group. Then, the data strip of the high intermediate index failed data disk is reconstructed using the corresponding stepped parity of the second group and the other members of the corresponding stepped parity set having the current data strip of the high intermediate index failed data disk as the lowest disk indexed member on that stripe. Next, the data strip of the intermediate index failed data disk is reconstructed by using the corresponding horizontal parity and the other members of the corresponding horizontal parity set.

This alternating process is repeated until the data strips of the low index failed disk and high index failed disks are reconstructed, whereupon the remaining strips of the low intermediate indexed failed disk, the high indexed failed disk, and the high intermediate indexed failed disk, and the intermediate index disk are iteratively reconstructed as described above. Finally, the parity strips on the failed disks are reconstructed using the appropriate data strips that are intact.

In FIG. 3 for example, the disk having a low index is designated as $d_i$, the disk having the low intermediate index is designated $d_j$, the disk having the intermediate index is designated $d_k$, the disk having the high intermediate index is designated $d_l$, and the disk having the high index is designated $d_p$. Accordingly, $i<j<k<l<p$. The data in each failed disk is alternately reconstructed starting with strip $S_{1,i}$ using the parity information in the corresponding diagonal parity set of the first group. This is possible because all the disks contributing to the diagonal parity set of the first group required to rebuild strip $S_{1,i}$ are located to the left of disk $d_i$, and are therefore guaranteed to be intact. Then, strips $S_{2,i}$, $S_{3,i}$, . . . $S_{j-i,i}$ are reconstructed using the corresponding diagonal parity sets of the first group. The last strip that can be reconstructed on disk $d_i$ using the diagonal parity set of the first group is $S_{j-i,i}$ because the diagonal parity set of the first group containing strip $S_{j-i+1,i}$ would intersect with strip $S_{1,j}$ on disk $d_j$, which has not been recreated yet. Therefore, strip $S_{1,j}$ is reconstructed using the stepped parity set of the first group that contains strip $S_{1,j}$ as its rightmost strip. This is possible because all the data disks contributing to the stepped parity set of the first group required to rebuild strip $S_{1,j}$ are located to the left of disk $d_j$ and, on any given data disk, a strip belonging to that stepped parity set of the first group has a row index equal to or lower than the strip belonging to the diagonal parity set of the first group used to recreate strip $S_{j-i,i}$.

Then, strip $S_{1,p}$ is reconstructed using the corresponding diagonal parity information of the second group. This is possible because all the data disks contributing to the diagonal parity set of the second group required to rebuild strip $S_{1,p}$ are located to the right of disk $d_p$ and are therefore guaranteed to be intact. Then, strips $S_{2,p}$, $S_{3,p}$, . . . $S_{p-l,p}$ are reconstructed using the corresponding diagonal parity sets of the first group. The last strip that can be reconstructed on disk $d_p$ using the diagonal parity set of the second group is $S_{p-l,p}$ because the diagonal parity set of the second group containing strip $S_{p-l+1,p}$ would intersect with strip $S_{1,l}$ on disk $d_l$, which has not been recreated yet. Therefore, strip $_{1,l}$ is reconstructed using the stepped parity set of the second group that contains strip $S_{1,l}$ as its leftmost strip. This is possible because all the data disks contributing to the stepped parity set of the second group required to rebuild strip $S_{1,l}$ are located to the right of disk $d_l$ and, on any given data disk, a strip belonging to that stepped parity set of the second group has a row index equal to or lower than the strip belonging to the diagonal parity set of the second group used to recreate strip $S_{p-l,p}$. Then, strip $S_{1,k}$ is reconstructed using the corresponding horizontal parity set.

Next, strip $S_{2,i}$ is reconstructed using the diagonal parity information from the first group. Then, strip $S_{2,j}$ is reconstructed using the corresponding stepped parity information of the first group that contains $S_{2,j}$ followed by strip $S_{2,p}$ using the corresponding diagonal parity information of the second group. Then, $S_{2,l}$ is reconstructed by using the corresponding stepped parity information of the second group and $S_{2,k}$ is recreated using the horizontal parity set.

This technique is iterated for each failed disk $d_i$, $d_j$, $d_p$, $d_l$, and $d_k$ using the diagonal parity set of the first group, the stepped parity set of the first group, the diagonal parity of the second group, the stepped parity of the second group, and the horizontal parity sets, respectively. When the reconstruction of a disk (such as $d_i$ and $d_p$) is completed prior to the others, the reconstruction of the remaining failed disk is accomplished using the iterative technique of reconstructing the remaining strips (i.e., for each remaining row after disk $d_i$ and $d_p$ are completely restored, $d_j$ followed by $d_l$ and $d_k$). Once the failed data disks are reconstructed, the strips on the failed parity disks can be restored using the reconstructed data on the disks. Finally, the parity strips on the disks $d_i$, $d_j$, $d_p$, $d_l$, and $d_k$ are reconstructed using the appropriate data strips that are intact.

Accordingly, a method and system for providing five simultaneous disk failures in a disk array is provided. By assembling horizontal, diagonal, and stepped parity sets and storing the corresponding parities in the array, an efficient scheme for providing up to four disk fault tolerance is realized independently of the size or format of the disk array.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. In an N×M logical representation of data in an array of independent disks organized into a plurality of stripes, each stripe comprising a plurality of strips, each of the strips being located on only a corresponding single disk, a method of providing multiple disk fault tolerance comprising:
   arranging strips containing data, proceeding in a first generally diagonal direction, into a first group of a plurality of stepped parity sets by organizing the strips in a stepped configuration for each stepped parity set such that any one strip may be included in more than one stepped parity set; and
   arranging strips containing data, proceeding in a second generally diagonal direction, into a second group of a plurality of stepped parity sets by organizing the strips in a stepped configuration for each stepped parity set such that any one strip may be included in more than one stepped parity set.

2. The method of claim 1 further comprising arranging strips containing data into a plurality of horizontal parity sets, in which any one strip is included only once in any one of the parity sets.

3. The method of claim 1 further comprising arranging strips containing data into a plurality of diagonal parity sets, in which any one strip is included only once in any one of the parity sets.

4. The method of claim 1, the stepped configuration assuming a stair step pattern having a tread to riser ratio of at least two strips to one strip.

5. The method of claim 1, wherein a strip is a member of at least two of the stepped parity sets.

6. In an N×M logical representation of data in an array of independent disks organized into a plurality of stripes, each stripe comprising a plurality of strips, each of the strips being located on only a corresponding single disk, a method of providing multiple disk fault tolerance comprising:
   arranging strips containing data into horizontal and diagonal parity sets, wherein each parity set comprises at least one data strip as a member and no single data strip is repeated in any one parity set;
   arranging strips containing data, proceeding in a first generally diagonal direction, into a first group of a plurality of stepped parity sets by organizing the strips in a stepped configuration for each stepped parity set such that any one strip may be included in more than one stepped parity set; and
   arranging strips containing data, proceeding in a second generally diagonal direction, into a second group of a plurality of stepped parity sets by organizing the strips in a stepped configuration for each stepped parity set such that any one strip may be included in more than one stepped parity set;
   calculating a horizontal parity for each horizontal parity set;
   calculating a diagonal parity for each diagonal parity set;
   calculating a stepped parity for each stepped parity set;
   storing each respective calculated horizontal parity of each horizontal parity set in a corresponding strip of a horizontal parity disk;
   storing at least some of the calculated diagonal parities of each diagonal parity set in a respective one of a plurality of strips of a diagonal parity disk and storing a remainder of the calculated diagonal parities in a respective one of a plurality of strips in a diagonal parity stripe so that no members of a contributing diagonal parity set have the same disk index as the disk index of the respective one of a plurality of strips of the diagonal parity stripe; and
   storing at least some of the calculated stepped parities of each stepped parity set in a respective one of a plurality of strips of a stepped parity disk and storing a remainder of the calculated stepped parities in a respective one of a plurality of strips in a stepped parity stripe so that no members of a contributing stepped parity set have the same disk index as the disk index of the respective one of a plurality of strips of the stepped parity stripe.

7. The method of claim 6, further comprising alternately storing at least some of the calculated stepped parities of a respective group in at least two stepped parity disks.

8. The method of claim 6, wherein storing the stepped parities further comprises:
   alternately storing at least some of the calculated stepped parities of each stepped parity set in the first group in a respective one of a plurality of strips of a first and second stepped parity disk; and
   storing a remainder of the calculated stepped parities of each stepped parity set in the first group in a respective one of a plurality of strips in a first stepped parity stripe so that no members of a contributing stepped parity set have the same disk index as the disk index of the respective one of a plurality of strips of the stepped parity stripe.

9. The method of claim 8, wherein storing the remainder of the calculated stepped parities further comprises storing the remainder in a stepped parity stripe so that each respective stepped parity is stored in a strip of the stepped parity stripe having a smaller disk index than all contributing disk indexes of each data strip of the corresponding stepped parity set.

10. The method of claim 6, wherein storing the stepped parities further comprises:
    alternately storing at least some of the calculated stepped parities of each stepped parity set in the second group in a respective one of a plurality of strips of a third and fourth stepped parity disk; and
    storing a remainder of the calculated stepped parities of each stepped parity set in the second group in a respective one of a plurality of strips in a second stepped parity stripe so that the no members of a contributing stepped parity set have the same disk index as the disk index of the respective one of a plurality of strips of the stepped parity stripe.

11. The method of claim 6 further comprising:
    reserving the horizontal parity disk to store horizontal parity;

reserving at least two diagonal parity disks to store diagonal parity;

reserving at least two diagonal parity stripes, across each of the disks in the array, to store diagonal parity;

reserving at least four stepped parity disks to store stepped parity;

reserving at least two stepped parity stripes, across each of the disks in the array, to store stepped parity; and reserving the remaining unreserved strips in the remaining unreserved disks in the array for data.

12. The method of claim 11, wherein reserving at least two stepped parity disks further comprises:

reserving a first and second stepped parity disk to store stepped parities calculated for the first group of stepped parity sets; and reserving a third and fourth stepped parity disk to store stepped parities calculated for the second group of stepped parity sets.

13. The method of claim 11, wherein reserving at least two diagonal parity stripes further comprises:

reserving a first diagonal parity stripe, across each of the disks in the array, to store diagonal parities calculated for the first group of diagonal parity sets; and reserving a second diagonal parity stripe, across each of the disks in the array, to store diagonal parities calculated for the second group of diagonal parity sets.

14. The method of claim 6, wherein the step of arranging strips containing data into horizontal, diagonal, and stepped parity sets further comprises:

assembling horizontal parity sets across each stripe of the array containing data;

assembling diagonal parity sets across diagonals traversing the stripes in the array containing data; and assembling stepped parity sets across stepped arrangements traversing the stripes in the array containing data.

15. The method of claim 14, wherein the step of assembling stepped parity sets further comprises:

establishing a first stepped parity set for the first group as a data strip having the lowest disk index and stripe index; and establishing contiguous stepped parity sets by progressing in a higher disk index, higher stripe indexed direction through the array until the last stair step parity set formed is a data strip having the highest disk and highest stripe index.

16. The method of claim 14, wherein the step of assembling stepped parity sets further comprises:

establishing a first stepped parity set for the second group as a data strip having the highest disk index and stripe index;

establishing contiguous stepped parity sets by progressing in a lower disk index, higher stripe indexed direction through the array until the last stair step parity set formed is a data strip having the lowest disk and highest stripe index.

17. The method of claim 14, wherein the stepped parity sets comprise a stair step pattern having a tread to riser ratio of two strips to one strip.

18. The method of claim 17, wherein a lowest tread of a respective stepped parity set of the first group comprises a lowest disk indexed and a highest stripe indexed strip of the stepped parity set and a highest tread of the respective stepped parity set comprises a highest disk indexed and a lowest stripe indexed strip of the stepped parity set.

19. The method of claim 17, wherein a lowest tread of a respective stepped parity set of the second group comprises a highest disk indexed and a highest stripe indexed strip of the stepped parity set and a highest tread of the respective stepped parity set comprises a lowest disk indexed and a lowest stripe indexed strip of the stepped parity set.

20. The method of claim 6, wherein the step of calculating the stepped parity further comprises calculating the stepped parity of data stored in each stepped parity set traversing stripes containing data in the array.

21. The method of claim 6, wherein calculating the horizontal, diagonal, and stepped parities for each parity set comprises computing the exclusive-or (XOR) of the information in each data strip of each parity set.

22. The method of claim 21, wherein calculating the stepped parity for the first group, $s1P_i$, for each diagonal traversing the stripes containing data using the exclusive-or sum of the information in each diagonal is performed according to the equations:

$s1P_i = B_{1,t} \oplus B_{2,t-2} \oplus B_{3,t-4} \oplus \ldots B_{p,q}$ if $1 \leq i \leq N$, $s1P_i = B_{r,t} \oplus B_{r+1,t-2} \oplus B_{r+2,t-4} \oplus \ldots B_{p,q}$ if $N < i \leq 2M$, $s1P_i = B_{r,t} \oplus B_{r+1,t-2} \oplus B_{r+2,t-4} \oplus \ldots B_{M,u}$ if $2M < i < 2M+N-1$, where i is an index counter for the number of stepped parity sets arranged in the array, N is the number of disks containing data in the array, M is the number of stripes containing data in the array, $B_{i,k} = S_{i,k}$ if $k=1$, $B_{i,k} = S_{i,k} \oplus S_{i,k-1}$ if $1 < k \leq N$, $B_{i,k} = S_{i,k-1}$ if $k=N+1$, $S_{i,k}$ is the data stored in strip i of disk k, $p=(i+1)$div 2, $q=(i-1)$mod $2+1$, $r=(i-N+2)$div 2, $t=N+(N+i)$mod 2, and $u=(i-2M)+2$.

23. The method of claim 21, wherein calculating the stepped parity for the second group, $x2P_i$, for each diagonal traversing the stripes containing data using the exclusive-or sum of the information in each diagonal is performed according to the equations:

$s2P_i = B_{1,N-i+1} \oplus B_{2,N-i+3} \oplus B_{3,N-i+5} \oplus \ldots B_{p,N-q+1}$ if $1 \leq i \leq N$, $s2P_i = B_{r,t} \oplus B_{r+1,t+2} \oplus B_{r+2,t+4} \oplus \ldots B_{p,N-q+1}$ if $N < i \leq 2M$, $s2P_i = Br_{,t} \oplus B_{r+1,t+2} \alpha B_{r+2,t+4} \oplus \ldots B_{M,u}$ if $2M < i < 2M+N-1$, where i is an index counter for the number of stepped parity sets arranged in the array, N is the number of disks containing data in the array, M is the number of stripes containing data in the array, $B_{i,k} = S_{i,k+1}$ if $k=0$, $B_{i,k} = S_{i,k} \oplus S_{i,k+1}$ if $1 \leq k \leq N-1$, $B_{i,k} = S_{i,k}$ if $k=N$, $S_{i,k}$ is the information stored in strip i of disk k, $p=(i+1)$div 2, $q=(i-1)$mod $2+1$, $r=(i-N+2)$div 2, $t=1-(N+i)$mod 2, and $u=N+2M-(i+1)$.

24. The method of claim 6, wherein the step of storing the calculated stepped parity for each stepped parity set of the first group further comprises alternately storing, beginning with the strip on the lowest indexed stripe, the calculated stepped parity, beginning with the first stepped parity set, in a strip of the first stepped parity disk; then storing the next calculated stepped parity in a strip of the second stepped parity disk, repeating the alternating storing process, and, when the stepped parity strip on the next to highest indexed stripe of the second stepped parity disk is filled, sequentially storing, beginning with the strip on the lowest indexed disk, the calculated stepped parity for the remaining stepped parity sets in the stepped parity stripe until the calculated stepped parities for each of the stepped parity sets have been stored.

25. The method of claim 6, wherein the step of storing the calculated stepped parity for each stepped parity set of the second group further comprises alternately storing, beginning with the strip on the lowest indexed stripe, the calculated stepped parity, beginning with the first stepped parity set, in a strip of the third stepped parity disk; then storing the next calculated stepped parity in a strip of the fourth stepped parity disk, repeating the alternating storing process, and, when the stepped parity strip on the next to highest indexed stripe of the fourth stepped parity disk is filled, sequentially storing, beginning with the strip on the highest indexed disk containing data, the calculated stepped parity for the remaining stepped parity sets in the stepped parity stripe until the calculated stepped parities for each of the stepped parity sets have been stored.

26. The method of claim 6, further comprising reconstituting lost data on five or fewer concurrently failed disks by using the corresponding horizontal parities, diagonal parities, stepped parities and data stored on the disks.

27. The method of claim 26, wherein reconstructing the lost data comprises, in the case of a failed data disk and four failed parity disks:
   reconstructing each of the data strips of the failed data disks, starting with the strip on the lowest indexed stripe, by using the corresponding parity information from the intact parity disks, the parity information in the intact parity stripes, and the other intact data members of the corresponding parity sets; and
   reconstructing each of the parity strips of the failed parity disks and the parity strips on the failed data disks by using the intact data members of the corresponding parity sets.

28. The method of claim 26, wherein reconstructing the lost data comprises, in the case of two failed data disks, where one disk has a low index and one disk has a high index, wherein the horizontal parity disk and the first diagonal parity disk remain intact:
   reconstructing each of the data strips of the failed data disks by starting at the strip on the lowest indexed stripe of the lower index failed data disk and the strip on the lowest indexed stripe of the higher index failed data disk;
   alternately reconstructing the data strip of the lower indexed failed data disk by using the corresponding intact diagonal parity set of the first group that includes the strip on the lowest indexed stripe of the lower index failed data disk, then reconstructing the data strip of the higher indexed failed data disk, by using the corresponding intact horizontal parity set until each data strip of each of the failed disks is reconstructed;
   reconstructing each of the parity strips of the failed parity disks by using the members of the corresponding parity sets; and
   reconstructing each of the parity strips of the failed data disks by using the members of the corresponding parity sets.

29. The method of claim 26, wherein reconstructing the lost data comprises, in the case of two failed data disks, where one disk has a low index and one disk has a high index, wherein the horizontal parity disk and the first and second stepped parity disks (storing parity for the first group of stepped parity sets) remain intact:
   reconstructing each of the data strips of the failed data disks by starting at the strip on the lowest indexed stripe of the lower index failed data disk and the strip on the lowest indexed stripe of the higher index failed data disk;
   alternately reconstructing the data strip of the lower indexed failed data disk by using the corresponding intact stepped parity set of the first group that includes the strip on the lowest indexed stripe of the lower index failed data disk as the highest disk indexed strip, then reconstructing the data strip of the higher indexed failed data disk, by using the corresponding intact horizontal parity set until each data strip of each of the failed disks is reconstructed;
   reconstructing each of the parity strips of the failed parity disks by using the members of the corresponding parity sets; and
   reconstructing each of the parity strips of the failed data disks by using the members of the corresponding parity sets.

30. The method of claim 26, wherein reconstructing the lost data comprises, in the case of two failed data disks, where one disk has a low index and one disk has a high index, wherein the horizontal parity disk and the second diagonal parity disk remain intact:
   reconstructing each of the data strips of the failed data disks by starting at the strip on the strip on the lowest indexed stripe of the higher index failed data disk and the lowest indexed stripe of the lower index failed data disk;
   alternately reconstructing the data strip of the higher index failed data disk by using the corresponding intact diagonal parity set that includes the strip on the lowest indexed stripe of the higher index failed data disk, then reconstructing the data strip of the lower index failed data disk, by using the corresponding intact horizontal parity set until each data strip of each of the failed disks is reconstructed;
   reconstructing each of the parity strips of the failed parity disks by using the members of the corresponding parity sets; and
   reconstructing each of the parity strips of the failed data disks by using the members of the corresponding parity sets.

31. The method of claim 26, wherein reconstructing the lost data comprises, in the case of two failed data disks, where one disk has a low index and one disk has a high index, wherein the horizontal parity disk and the third and fourth stepped parity disks remain intact:
   reconstructing each of the data strips of the failed data disks by starting at the strip on the lowest indexed stripe of the higher index failed data disk and the strip on the lowest indexed stripe of the lower index failed data disk;
   alternately reconstructing the data strip of the higher index failed data disk by using the corresponding intact stepped parity set that includes the strip on the lowest indexed stripe of the higher index failed data disk as the lowest disk indexed strip, then reconstructing the data strip of the lower index failed data disk, by using the corresponding intact horizontal parity set until each data strip of each of the failed disks is reconstructed;

reconstructing each of the parity strips of the failed parity disks by using the members of the corresponding parity sets; and reconstructing each of the parity strips of the failed data disks by using the members of the corresponding parity sets.

32. The method of claim 26, wherein reconstructing the lost data comprises, in the case of two failed data disks, where one disk has a low index and one disk has a high index, wherein the second diagonal parity disk and the third and fourth stepped parity disks remain intact:

reconstructing each of the data strips of the failed data disks by starting at the strip on the strip on the lowest indexed stripe of the higher index failed data disk and the lowest indexed stripe of the lower index failed data disk;

sequentially reconstructing the data strips of the high index failed data disk by using the corresponding diagonal parity and the other members of the corresponding diagonal parity of the second group, until reaching the data strip of the high index failed data disk having a stripe index equal to the difference in the indexes of the high index failed data disk and the low index failed data disk;

reconstructing the strip on the lowest index stripe of the low index failed data disk using the corresponding stepped parity and the other members of the corresponding stepped parity set of the second group having the current data strip of the low index failed data disk as the lowest disk indexed member;

alternately reconstructing, in a cyclic order, the data strip of the high index failed data disk by using the corresponding diagonal parity and the other members of the corresponding diagonal parity set of the second group and reconstructing the data strip of the lowest indexed stripe of the low index failed data disk by using the corresponding stepped parity and the other members of the corresponding stepped parity set of the second group having the current data strip of the low index failed data disk as the lowest disk indexed member compared to any other strip on the same stripe that belongs to that stepped parity set, until the data strips of the low index and the high index failed disks are reconstructed;

reconstructing each of the parity strips of the failed parity disks by using the members of the corresponding parity set; and reconstructing each of the parity strips of the failed data disks by using the members of the corresponding parity sets.

33. The method of claim 26, wherein reconstructing the lost data comprises, in the case of two failed data disks, where one disk has a low index and one disk has a high index, wherein the first diagonal parity disk and the first and second stepped parity disks remain intact:

reconstructing each of the data strips of the failed data disks by starting at the strip on the lowest indexed stripe of the lower index failed data disk and the strip on the lowest indexed stripe of the higher index failed data disk;

sequentially reconstructing the data strips of the low index failed data disk by using the corresponding diagonal parity and the other members of the corresponding diagonal parity of the first group, until reaching the data strip of the low index failed data disk having a stripe index equal to the difference in the indexes between the high index failed data disk and the low index failed data disk;

reconstructing the strip on the lowest index stripe of the high index failed data disk using the corresponding stepped parity and the other members of the corresponding stepped parity set of the first group having the current data strip of the high index failed data disk as the highest disk indexed member;

alternately reconstructing, in a cyclic order, the data strips of the low index failed data disk by using the corresponding diagonal parity and the other members of the corresponding diagonal parity set of the first group and reconstructing the data strip of the lowest indexed stripe of the high index failed data disk by using the corresponding stepped parity and the other members of the corresponding stepped parity set of the first group having the current data strip of the high index failed data disk as the highest disk indexed member compared to any other strip on the same stripe that belongs to that stepped parity set, until the data strips of the low index and the high index failed disks are reconstructed;

reconstructing each of the parity strips of the failed parity disks by using the members of the corresponding parity set; and reconstructing each of the parity strips of the failed data disks by using the members of the corresponding parity sets.

34. The method of claim 26, wherein reconstructing the lost data comprises, in the case of two failed data disks, where one disk has a low index and one disk has a high index, wherein either the first diagonal parity disk or the first and second stepped parity disks and either the second diagonal parity disk and the third and fourth stepped parity disks remain intact:

reconstructing each of the data strips of the failed data disks by starting at the strip on the lowest indexed stripe of the low index failed data disk and the strip on the lowest indexed stripe of the high index failed data disk;

alternately reconstructing, in a cyclic order, the data strip of the lower indexed failed data disk by using the intact corresponding diagonal parity set of the first group or the stepped parity set of the first group that includes the strip on the lowest indexed stripe of the lower index failed data disk as the highest disk indexed strip, then reconstructing the data strip of the higher indexed failed data disk, by using the intact corresponding diagonal parity set of the second group or the stepped parity set of the second group that includes the strip on the lowest indexed stripe of the high index failed data disk as the lowest disk indexed strip, until each data strip of each of the failed disks is reconstructed;

reconstructing each of the parity strips of the failed parity disks by using the members of the corresponding parity sets; and reconstructing each of the parity strips of the failed data disks by using the members of the corresponding parity sets.

35. The method of claim 26, wherein reconstructing the lost data comprises, in the case of three failed data disks, where one disk has a low index, one disk has an intermediate index, and one disk has a high index, wherein the horizontal parity disk, the first diagonal parity disk and the first and second stepped parity disks remain intact:

reconstructing each of the data strips of the failed data disks by starting at the strip on the lowest indexed stripe of the low index failed data disk, the lowest indexed stripe of the intermediate index failed data disk, and the strip on the lowest indexed stripe of the high index failed data disk;

sequentially reconstructing the data strips of the low index failed data disk by using the corresponding diagonal parity and the other members of the corresponding diagonal parity of the first group, until reaching the data strip of the low index failed data disk having a stripe index equal to the difference in the indexes of the intermediate index failed data disk and the low index failed data disk;

reconstructing the strip on the lowest index stripe of the intermediate index failed data disk using the corresponding stepped parity and the other members of the corresponding stepped parity set of the first group having the current data strip of the intermediate index failed data disk as the highest disk indexed member;

reconstructing the strip on the lowest index stripe of the high index failed data disk using the corresponding horizontal parity and the other members of the corresponding horizontal parity set;

alternately reconstructing, in a cyclic order, the data strips of the low index failed data disk by using the corresponding diagonal parity and the other members of the corresponding diagonal parity set of the first group, reconstructing the data strips of the intermediate index failed data disk by using the corresponding stepped parity and the other members of the corresponding stepped parity set of the first group having the current data strip of the intermediate index failed data disk as the highest disk indexed member on that stripe, and reconstructing the data strip of the high index failed data disk by using the corresponding horizontal parity and the other members of the corresponding horizontal parity set until the data strips of the low index, intermediate index, and the high index failed disks are reconstructed;

reconstructing each of the parity strips of the failed parity disks by using the members of the corresponding parity set; and reconstructing each of the parity strips of the failed data disks by using the members of the corresponding parity sets.

36. The method of claim 26, wherein reconstructing the lost data comprises, in the case of three failed data disks, where one disk has a low index, one disk has an intermediate index, and one disk has a high index, wherein the horizontal parity disk, the second diagonal parity disk and the third and fourth stepped parity disks remain intact:

reconstructing each of the data strips of the failed data disks by starting at the strip on the lowest indexed stripe of the high index failed data disk, the lowest indexed stripe of the intermediate index failed data disk and the strip on the lowest indexed stripe of the low index failed data disk;

sequentially reconstructing the data strips of the high index failed data disk by using the corresponding diagonal parity and the other members of the corresponding diagonal parity of the second group, until reaching the data strip of the high index failed data disk having a stripe index equal to the difference in the indexes of the high index failed data disk and the intermediate index failed data disk;

reconstructing the strip on the lowest index stripe of the intermediate index failed data disk using the corresponding stepped parity and the other members of the corresponding stepped parity set of the second group having the current data strip of the intermediate index failed data disk as the lowest disk indexed member;

reconstructing the strip on the lowest index stripe of the low index failed data disk using the corresponding horizontal parity and the other members of the corresponding horizontal parity set;

alternately reconstructing, in a cyclic order, the data strips of the high index failed data disk by using the corresponding diagonal parity and the other members of the corresponding diagonal parity set of the second group, reconstructing the data strips of the intermediate index failed data disk by using the corresponding stepped parity and the other members of the corresponding stepped parity set of the second group having the current data strip of the intermediate index failed data disk as the lowest disk indexed member on that stripe, and reconstructing the data strip of the low index failed data disk by using the corresponding horizontal parity and the other members of the corresponding horizontal parity set until the data strips of the high index, intermediate index, and the low index failed disks are reconstructed;

reconstructing each of the parity strips of the failed parity disks by using the members of the corresponding parity set; and reconstructing each of the parity strips of the failed data disks by using the members of the corresponding parity sets.

37. The method of claim 26, wherein reconstructing the lost data comprises, in the case of three failed data disks, where one disk has a low index, one disk has an intermediate index, and one disk has a high index, wherein the horizontal parity disk, the second diagonal parity disk or the third and fourth stepped parity disks, and the first diagonal parity disk or the first and second stepped parity disks remain intact:

reconstructing each of the data strips of the failed data disks by starting at the strip on the lowest indexed stripe of the high index failed data disk, the strip on the lowest indexed stripe of the low index failed data disk, and the lowest indexed stripe of the intermediate index failed data disk;

alternately reconstructing, in a cyclic order, the data strips of the high index failed data disk by using the corresponding intact diagonal parity and the other members of the corresponding diagonal parity set of the second group, or the stepped parity and the other members of the corresponding stepped parity set of the second group, reconstructing the data strip of the low index failed data disk by using the corresponding diagonal parity and the other members of the corresponding diagonal parity set of the first group, or the stepped parity and the other members of the corresponding stepped parity set of the first group, and reconstructing the data strips of the intermediated index failed data disk by using the corresponding horizontal parity and the other members of the corresponding horizontal parity set until the data strips of the high index, intermediate index, and the low index failed disks are reconstructed;

reconstructing each of the parity strips of the failed parity disks by using the members of the corresponding parity set; and reconstructing each of the parity strips of the failed data disks by using the members of the corresponding parity sets.

38. The method of claim 26, wherein reconstructing the lost data comprises, in the case of three failed data disks, where one disk has a low index, one disk has an intermediate index, and one disk has a high index, wherein the first diagonal parity disk, the first and second stepped parity disks, and the second diagonal parity disk or the third and fourth stepped parity disks remain intact:

reconstructing each of the data strips of the failed data disks by starting at the strip on the lowest indexed stripe of the low index failed data disk, the lowest indexed stripe of the intermediate index failed data disk, and the strip on the lowest indexed stripe of the high index failed data disk;

sequentially reconstructing the data strips of the low index failed data disk by using the corresponding diagonal parity and the other members of the corresponding diagonal parity set of the first group, until reaching the data strip of the low index failed data disk having a stripe index equal to the difference in the indexes of the intermediate index failed data disk and the low index failed data disk;

reconstructing the strip on the lowest index stripe of the intermediate index failed data disk using the corresponding stepped parity and the other members of the corresponding stepped parity set of the first group having the current data strip of the intermediate index failed data disk as the highest disk indexed member;

reconstructing the strip on the lowest index stripe of the high index failed data disk using the corresponding intact diagonal parity set of the second group or the stepped parity set of the second group;

alternately reconstructing, in a cyclic order, the data strips of the low index failed data disk by using the corresponding diagonal parity and the other members of the corresponding diagonal parity set of the first group, reconstructing the data strips of the intermediate index failed data disk by using the corresponding stepped parity and the other members of the corresponding stepped parity set of the first group having the data strip of the intermediate indexed failed data disk as the highest disk indexed member on that stripe, and reconstructing the data strip of the high index failed data disk by using the corresponding intact diagonal parity set of the second group or the stepped parity of the second group; until the data strips of the low index, intermediate index, and the high index failed disks are reconstructed;

reconstructing each of the parity strips of the failed parity disks by using the members of the corresponding parity set; and reconstructing each of the parity strips of the failed data disks by using the members of the corresponding parity sets.

39. The method of claim 26, wherein reconstructing the lost data comprises, in the case of three failed data disks, where one disk has a low index, one disk has an intermediate index, and one disk has a high index, wherein the second diagonal parity disk, the third and fourth stepped parity disks, and the first diagonal parity disk or the first and second stepped parity disks remain intact:

reconstructing each of the data strips of the failed data disks by starting at the strip on the lowest indexed stripe of the high index failed data disk, the lowest indexed stripe of the intermediate index failed data disk, and the strip on the lowest indexed stripe of the low index failed data disk;

sequentially reconstructing the data strips of the high index failed data disk by using the corresponding diagonal parity and the other members of the corresponding diagonal parity of the second group, until reaching the data strip of the high index failed data disk having a stripe index equal to the difference in the indexes of the high index failed data disk and the intermediate index failed data disk;

reconstructing the strip on the lowest index stripe of the intermediate index failed data disk using the corresponding stepped parity and the other members of the corresponding stepped parity set of the second group having the current data strip of the intermediate index failed data disk as the lowest disk indexed member;

reconstructing the strip on the lowest index stripe of the low index failed data disk using the corresponding intact diagonal parity set of the first group or the stepped parity set of the first group;

alternately reconstructing, in a cyclic order, the data strips of the high index failed data disk by using the corresponding diagonal parity and the other members of the corresponding diagonal parity set of the second group, reconstructing the data strips of the intermediate index failed data disk by using the corresponding stepped parity and the other members of the corresponding stepped parity set of the second group having the data strip of the intermediate indexed failed data disk as the lowest disk indexed member on that stripe, and reconstructing the data strip of the low index failed data disk by using the corresponding intact diagonal parity set of the first group or the stepped parity set of the first group until the data strips of the high index, intermediate index, and the low index failed disks are reconstructed;

reconstructing each of the parity strips of the failed parity disks by using the members of the corresponding parity set; and reconstructing each of the parity strips of the failed data disks by using the members of the corresponding parity sets.

40. The method of claim 26, wherein reconstructing the lost data comprises, in the case of four failed data disks, where one disk has a low index, one disk has a low intermediate index, one disk has a high intermediate index, and one disk has a high index, wherein all the diagonal parity and the stepped parity disks remain intact:

reconstructing each of the data strips of the failed data disks by starting at the strip on the lowest indexed stripe of the low index failed data disk, the strip on the lowest index stripe of the low intermediate index failed data disk, the strip on the lowest indexed stripe of the high index failed data disk, and the strip on the lowest index stripe of the high intermediate index failed data disk;

sequentially reconstructing the data strips of the low index failed data disk by using the corresponding diagonal parity and the other members of the corresponding diagonal parity set of the first group, until reaching the data strip of the low index failed data disk having a stripe index equal to the difference in the indexes of the low intermediate index failed data disk and the low index failed data disk;

reconstructing the strip on the lowest indexed stripe of the low intermediate index failed data disk using the corresponding stepped parity and the other members of the corresponding stepped parity set of the first group having the current strip as the highest disk indexed strip;

sequentially reconstructing the data strips of the high index failed data disk by using the corresponding diagonal parity and the other members of the corresponding diagonal parity set of the second group, until reaching the data strip of the high index failed data disk having a stripe index equal to the difference in the indexes of the high index failed data disk and the high intermediate index failed data disk;

reconstructing the strip on the lowest index stripe of the high intermediate index failed data disk using the corresponding stepped parity and the other members of the corresponding stepped parity set of the second group having the current strip as the lowest disk indexed strip;

alternately reconstructing, in a cyclic order, the data strip of the low index failed data disk by using the corresponding diagonal parity and the other members of the corresponding diagonal parity set of the first group, then reconstructing the data strip of the low intermediate index failed data disk by using the corresponding stepped parity and the other members of the corresponding stepped parity set of the first group having the data strip of the intermediate index failed data disk as the highest disk indexed strip on that stripe, then reconstructing the data strip of the high index failed data disk by using the corresponding diagonal parity and the other members of the corresponding diagonal parity set of the second group, then reconstructing the data strip of the high intermediate index failed data disk is reconstructed using the corresponding stepped parity and the other members of the corresponding stepped parity set of the second group having the current strip as the lowest disk indexed strip on that stripe, until the data strips of the low index failed disk, the low intermediate index, the high intermediate index, and the high index failed disks are reconstructed; and reconstructing each of the parity strips of the failed data disks by using the members of the corresponding parity sets.

41. The method of claim 26, wherein reconstructing the lost data comprises, in the case of four failed data disks, where one disk has a low index, one disk has a low intermediate index, one disk has a high intermediate index, and one disk has a high index, wherein the horizontal parity, the first diagonal parity, the first and second stepped parity, and the second diagonal parity or third and fourth stepped parity disks remain intact:

reconstructing each of the data strips of the failed data disks by starting at the strip on the lowest indexed stripe of the low index failed data disk, the strip on the lowest index stripe of the low intermediate index failed data disk, the strip on the lowest indexed stripe of the high index failed data disk, and the strip on the lowest index stripe of the high intermediate index failed data disk;

sequentially reconstructing the data strips of the low index failed data disk by using the corresponding diagonal parity and the other members of the corresponding diagonal parity set of the first group, until reaching the data strip of the low index failed data disk having a stripe index equal to the difference in the indexes of the low intermediate index failed data disk and the low index failed data disk;

reconstructing the strip on the lowest index stripe of the low intermediate index failed data disk using the corresponding stepped parity and the other members of the corresponding stepped parity set of the first group having the current data strip of the intermediate index failed data disk as the highest disk indexed member;

reconstructing the strip on the lowest indexed stripe of the high index failed data disk using the corresponding intact diagonal parity and the other members of the corresponding diagonal parity set of the second group or the stepped parity and the other members of the corresponding stepped parity set of the second group;

reconstructing the strip on the lowest indexed stripe of the high intermediate index failed data disk using the corresponding horizontal parity and the other members of the corresponding horizontal parity set;

alternately reconstructing, in a cyclic order, the data strip of the low index failed data disk by using the corresponding diagonal parity and the other members of the corresponding diagonal parity set of the first group, then reconstructing the data strip of the low intermediate index failed data disk by using the corresponding stepped parity and the other members of the corresponding stepped parity set of the first group having the data strip of the intermediate index failed data disk as the highest disk indexed strip on that stripe, then reconstructing the data strip of the high index failed data disk by using the intact corresponding diagonal parity and the other members of the corresponding diagonal parity set of the second group or the stepped parity and the other members of the corresponding stepped parity set of the second group; then reconstructing the data strip of the high intermediate index failed data disk using the corresponding horizontal parity and the other members of the corresponding horizontal parity set, until the data strips of the low index, the low intermediate index, the high intermediate index, and the high index failed disks are reconstructed; and reconstructing each of the parity strips of the failed data disks by using the members of the corresponding parity sets.

42. The method of claim 26, wherein reconstructing the lost data comprises, in the case of four failed data disks, where one disk has a low index, one disk has a low intermediate index, one disk has a high intermediate index, and one disk has a high index, wherein the horizontal parity, the first diagonal parity or the first and second stepped parity, and the second diagonal parity, and third and fourth stepped parity disks remain intact:

reconstructing each of the data strips of the failed data disks by starting at the strip on the lowest indexed stripe of the high index failed data disk, the strip on the lowest index stripe of the high intermediate index failed data disk, the strip on the lowest indexed stripe of the low index failed data disk, and the strip on the lowest index stripe of the low intermediate index failed data disk;

sequentially reconstructing the data strips of the high index failed data disk by using the corresponding diagonal parity and the other members of the corresponding diagonal parity of the second group, until reaching the data strip of the high index failed data disk having a stripe index equal to the difference in the indexes of the high index failed data disk and the high intermediate index failed data disk;

reconstructing the strip on the lowest index stripe of the high intermediate index failed data disk using the corresponding stepped parity and the other members of the corresponding stepped parity set of the second group having the current data strip of the high intermediate index failed data disk as the lowest disk indexed member;

reconstructing the strip on the lowest indexed stripe of the low index failed data disk using the corresponding intact diagonal parity and the other members of the corresponding intact diagonal parity set of the first group or the stepped parity and the other members of the corresponding stepped parity set of the first group;

reconstructing the strip on the lowest indexed stripe of the low intermediate index failed data disk using the corresponding horizontal parity and the other members of the corresponding horizontal parity set;

alternately reconstructing, in a cyclic order, the data strip of the high index failed data disk by using the corresponding diagonal parity and the other members of the corresponding diagonal parity set of the second group, then reconstructing the data strip of the high intermediate index failed data disk by using the corresponding stepped parity and the other members of the corresponding stepped parity set of the second group having the data strip of the intermediate index failed data disk as the lowest disk indexed member on that stripe, then reconstructing the data strip of the low index failed data disk by using the intact corresponding diagonal parity and the other members of the corresponding diagonal parity set of the first group or the stepped parity and the other members of the corresponding stepped parity set of the first group; then reconstructing the data strip of the low intermediate index failed data disk using the corresponding horizontal parity and the other members of the corresponding horizontal parity set, until the data strips of the high index, the low intermediate index, the high intermediate index, and the low index failed disks are reconstructed; and reconstructing each of the parity strips of the failed data disks by using the members of the corresponding parity sets.

43. The method of claim 26, wherein reconstructing the lost data comprises, in the case of five failed data disks, where one disk has a low index, one disk has a low intermediate index, one disk has an intermediate index, one disk has a high intermediate index, and one disk has a high index, wherein the horizontal parity, the first diagonal parity, the first and second stepped parity, the second diagonal parity and the third and fourth stepped parity disks remain intact:

reconstructing each data strip of the failed data disks by starting at the strip on the lowest indexed stripe of the low index failed data disk, the strip on the lowest index stripe of the low intermediate index failed data disk, the strip on the lowest indexed stripe of the high index failed data disk, the strip on the lowest index stripe of the high intermediate index failed data disk, and the strip on the lowest index stripe of the intermediate index failed data disk;

sequentially reconstructing the data strips of the low index failed data disk by using the corresponding diagonal parity and the other members of the corresponding diagonal parity of the first group, until reaching the data strip of the low index failed data disk having a stripe index equal to the difference in the indexes of the low intermediate index failed data disk and the low index failed data disk;

reconstructing the strip on the lowest index stripe of the low intermediate index failed data disk using the corresponding stepped parity and the other members of the corresponding stepped parity set of the first group having the current data strip of the intermediate index failed data disk as the highest disk indexed member;

sequentially reconstructing the strip on the lowest indexed stripe of the high index failed data disk using the corresponding diagonal parity and the other members of the corresponding diagonal parity set of the second group until reaching the data strip of the high index failed data disk having a stripe index equal to the difference in the indexes of the high index failed data disk and the high intermediate index failed data disk;

reconstructing the strip on the lowest indexed stripe of the high intermediate index failed data disk using the corresponding stepped parity and the other members of the corresponding stepped parity set of the second group having the current data strip of the high intermediate index failed data disk as the lowest disk indexed member;

reconstructing the strip on the lowest indexed stripe of the intermediate index failed data disk using the corresponding horizontal parity and the other members of the corresponding horizontal parity set;

alternately reconstructing, in a cyclic order, the data strip of the low index failed data disk by using the corresponding diagonal parity and the other members of the corresponding diagonal parity of the first group, then reconstructing the data strip of the low intermediate index failed data disk by using the corresponding stepped parity and the other members of the corresponding stepped parity set of the first group having the data strip of the low intermediate index failed data disk as the highest disk indexed member on that stripe, then reconstructing the data strip of the high index failed data disk by using the intact corresponding diagonal parity and the other members of the corresponding diagonal parity set of the second group; then reconstructing the data strip of the high intermediate index failed data disk using the corresponding stepped parity and the other members of the corresponding stepped parity set of the second group having the data strip of the high intermediate index failed data disk as the lowest disk indexed member on that stripe, then reconstructing the data strip of the intermediate index failed data disk using the corresponding horizontal parity and the other members of the corresponding horizontal parity set, until the data strips of the low index, the high index, the low intermediate index, the high intermediate index, and the intermediate index failed disks are reconstructed; and reconstructing each of the parity strips of the failed data disks by using the members of the corresponding parity sets.

44. A system for providing disk fault tolerance in an array of independent disks, comprising:

an N×M logical representation of data in an array of independent disks organized into a plurality of stripes, each stripe comprising a plurality of strips, each of the strips being located on only a corresponding single disk; and an array controller coupled to the disk array and configured to:

a. arrange strips containing data, proceeding in a first generally diagonal direction, into a first group of a plurality of stepped parity sets by organizing the strips in a stepped configuration for each stepped parity set such that any one strip may be included in more than one stepped parity set; and b. arrange strips containing data, proceeding in a second generally diagonal direction, into a second group of a plurality of stepped parity sets by organizing the strips in a stepped configuration for each stepped parity set such that any one strip may be included in more than one stepped parity set.

45. The system of claim 44, wherein the array controller is further configured to arrange strips containing data into a plurality of horizontal parity sets, in which any one strip is included only once in any one of the parity sets.

46. The system of claim 44, wherein the array controller is further configured to arrange strips containing data into a plurality of diagonal parity sets, in which any one strip is included only once in any one of the parity sets.

47. The system of claim 44, wherein the stepped configuration assumes a stair step pattern having a tread to riser ratio of at least two strips to one strip.

48. The system of claim 44, wherein a strip is a member of at least two of the stepped parity sets.

49. A system for providing disk fault tolerance in an array of independent disks, comprising:
- an N×M logical representation of data in an array of independent disks organized into a plurality of stripes, each stripe comprising a plurality of strips, each of the strips being located on only a corresponding single disk; and
- an array controller coupled to the disk array and configured to:
  - a. arrange strips containing data into horizontal and diagonal parity sets, wherein each parity set comprises at least one data strip as a member and no single data strip is repeated in any one parity set;
  - b. arrange strips containing data, proceeding in a first generally diagonal direction, into a first group of a plurality of stepped parity sets by organizing the strips in a stepped configuration for each stepped parity set such that any one strip may be included in more than one stepped parity set; and
  - c. arrange strips containing data, proceeding in a second generally diagonal direction, into a second group of a plurality of stepped parity sets by organizing the strips in a stepped configuration for each stepped parity set such that any one strip may be included in more than one stepped parity set;
  - d. calculate a horizontal parity for each horizontal parity set;
  - e. calculate a diagonal parity for each diagonal parity set;
  - f. calculate a stepped parity for each stepped parity set;
  - g. store each respective calculated horizontal parity of each horizontal parity set in a corresponding strip of a horizontal parity disk;
  - h. store at least some of the calculated diagonal parities of each diagonal parity set in a respective one of a plurality of strips of a diagonal parity disk and store a remainder of the calculated diagonal parities in a respective one of a plurality of strips in a diagonal parity stripe so that no members of a contributing diagonal parity set have the same disk index as the disk index of the respective one of a plurality of strips of the diagonal parity stripe; and
  - i. store at least some of the calculated stepped parities of each stepped parity set in a respective one of a plurality of strips of a stepped parity disk and store a remainder of the calculated stepped parities in a respective one of a plurality of strips in a stepped parity stripe so that no members of a contributing stepped parity set have the same disk index as the disk index of the respective one of a plurality of strips of the stepped parity stripe.

50. The system of claim 49, wherein the array controller is further configured to alternately store the at least some of the calculated stepped parities of a respective group in at least two stepped parity disks.

51. The system of claim 49, wherein the array controller is further configured to alternately store at least some of the calculated stepped parities of each stepped parity set in the first group in a respective one of a plurality of strips of a first and second stepped parity disk; and store a remainder of the calculated stepped parities of each stepped parity set in the first group in a respective one of a plurality of strips in a first stepped parity stripe so that no members of a contributing stepped parity set have the same disk index as the disk index of the respective one of a plurality of strips of the stepped parity stripe.

52. The system of claim 51, wherein the array controller is further configured to store the remainder in a stepped parity stripe so that each respective stepped parity is stored in a strip of the stepped parity stripe having a smaller disk index than all contributing disk indexes of each data strip of the corresponding stepped parity set.

53. The system of claim 49, wherein the array controller is further configured to alternately store at least some of the calculated stepped parities of each stepped parity set in the second group in a respective one of a plurality of strips of a third and fourth stepped parity disk; and store a remainder of the calculated stepped parities of each stepped parity set in the second group in a respective one of a plurality of strips in a second stepped parity stripe so that the no members of a contributing stepped parity set have the same disk index as the disk index of the respective one of a plurality of strips of the stepped parity stripe.

54. The system of claim 49, wherein the array controller is further configured to calculate the horizontal, diagonal, and stepped parities for each parity set by computing the exclusive-or (XOR) of the information in each data strip of each parity set.

55. The system of claim 49 wherein the array controller is further configured to reserve the horizontal parity disk to store horizontal parity; to reserve at least two diagonal parity disks to store diagonal parity; to reserve at least two diagonal parity stripes to store diagonal parity; to reserve at least four stepped parity disks to store stepped parity; to reserve at least two stepped parity stripes to store stepped parity; and to reserve the remaining unreserved strips in the remaining unreserved disks in the array for data.

56. The system of claim 49, wherein the array controller is further configured to assemble horizontal parity sets across each stripe of the array containing data; to assemble diagonal parity sets across diagonals traversing the stripes in the array containing data; and to assemble stepped parity sets across stepped arrangements traversing the stripes in the array containing data.

57. The system of claim 56, wherein the array controller is further configured to establish a first stepped parity set for the first group as a data strip having the lowest disk index and stripe index; and to establish contiguous stepped parity sets by progressing in a higher disk index, higher stripe indexed direction through the array until the last stair step parity set formed is a data strip having the highest disk and highest stripe index.

58. The system of claim 56, wherein the array controller is further configured to establish a first stepped parity set for the second group as a data strip having the highest disk index and stripe index; and establish contiguous stepped parity sets by progressing in a lower disk index, higher stripe indexed direction through the array until the last stair step parity set formed is a data strip having the lowest disk and highest stripe index.

59. The system of claim 49, wherein the stepped parity sets comprise a stair step pattern having a tread to riser ratio of two strips to one strip.

60. The system of claim 59 wherein a lowest tread of a respective stepped parity set of the first group comprises a lowest disk indexed and a highest stripe indexed strip of the stepped parity set and a highest tread of the respective stepped parity set comprises a highest disk indexed and a lowest stripe indexed strip of the stepped parity set.

61. The system of claim 59 wherein a lowest tread of a respective stepped parity set of the second group comprises a highest disk indexed and a highest stripe indexed strip of the stepped parity set and a highest tread of the respective stepped parity set comprises a lowest disk indexed and a lowest stripe indexed strip of the stepped parity set.

62. The system of claim 49, wherein the array controller is further configured to reconstitute lost data on five simultaneously failed disks in the array by using the corresponding stored horizontal, diagonal, and stepped parity information and the data stored on the remaining functional disks.

* * * * *